US010103953B1

(12) United States Patent
Chang et al.

(10) Patent No.: US 10,103,953 B1
(45) Date of Patent: Oct. 16, 2018

(54) METHODS AND SYSTEMS FOR ANALYZING ENTITY PERFORMANCE

(71) Applicant: PALANTIR TECHNOLOGIES INC., Palo Alto, CA (US)

(72) Inventors: Allen Chang, Mountain View, CA (US); Matthew Sills, San Francisco, CA (US); Katherine Brainard, Redwood City, CA (US); Rastan Boroujerdi, Menlo Park, CA (US); Ilya Nepomnyashchiy, Mountain View, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/800,447

(22) Filed: Jul. 15, 2015

Related U.S. Application Data

(60) Provisional application No. 62/160,541, filed on May 12, 2015.

(51) Int. Cl.
*G06Q 10/06* (2012.01)
*H04L 12/26* (2006.01)

(52) U.S. Cl.
CPC ....... *H04L 43/065* (2013.01); *G06Q 10/0639* (2013.01)

(58) Field of Classification Search
CPC ......... G06Q 10/0639; G06Q 10/06395; G06Q 10/10; G06Q 30/02
USPC .............................................. 705/7.29, 7.38
See application file for complete search history.

(56) References Cited

U.S. PATENT DOCUMENTS

| 5,021,792 | A | 6/1991 | Hwang |
| 5,241,625 | A | 8/1993 | Epard et al. |
| 5,555,503 | A | 9/1996 | Kyrtsos et al. |
| 5,670,987 | A | 9/1997 | Doi et al. |
| 5,826,021 | A | 10/1998 | Mastors et al. |
| 5,832,218 | A | 11/1998 | Gibbs et al. |
| 5,845,300 | A | 12/1998 | Corner |
| 5,878,434 | A | 3/1999 | Draper et al. |
| 5,897,636 | A | 4/1999 | Kaeser |
| 5,966,706 | A | 10/1999 | Biliris et al. |

(Continued)

FOREIGN PATENT DOCUMENTS

| AU | 2013251186 | 11/2015 |
| CN | 102546446 | 7/2012 |

(Continued)

OTHER PUBLICATIONS

US 8,712,906, 04/2014, Sprague et al. (withdrawn)

(Continued)

*Primary Examiner* — Thomas L Mansfield
*Assistant Examiner* — Amanda Gurski
(74) *Attorney, Agent, or Firm* — Schwegman Lundberg & Woessner, P.A.

(57) ABSTRACT

Approaches for analyzing entity performance are disclosed. A first set of data and a second set of data can be stored in a data structure. This data can be associated with a plurality of interactions, and can be modified to include additional interactions. These interactions can involve consuming entities and provisioning entities. The modified data structure can be queried to retrieve information associated with one or more entities. After information is retrieved, it can be provided to a user.

19 Claims, 8 Drawing Sheets

(56) References Cited

U.S. PATENT DOCUMENTS

| | | |
|---|---|---|
| 5,999,911 A | 12/1999 | Berg et al. |
| 6,006,242 A | 12/1999 | Poole et al. |
| 6,057,757 A | 5/2000 | Arrowsmith et al. |
| 6,065,026 A | 5/2000 | Cornelia et al. |
| 6,101,479 A * | 8/2000 | Shaw .................... G06Q 10/06 705/7.12 |
| 6,134,582 A | 10/2000 | Kennedy |
| 6,141,659 A | 10/2000 | Barker et al. |
| 6,189,003 B1 | 2/2001 | Leal |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,272,489 B1 | 8/2001 | Rauch et al. |
| 6,370,538 B1 | 4/2002 | Lamping et al. |
| 6,374,251 B1 | 4/2002 | Fayyad et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,567,936 B1 | 5/2003 | Yang et al. |
| 6,642,945 B1 | 11/2003 | Sharpe |
| 6,665,683 B1 | 12/2003 | Meltzer |
| 6,775,675 B1 | 8/2004 | Nwabueze et al. |
| 6,820,135 B1 | 11/2004 | Dingman |
| 6,850,317 B2 | 2/2005 | Mullins et al. |
| 6,944,821 B1 | 9/2005 | Bates et al. |
| 6,967,589 B1 | 11/2005 | Peters |
| 6,978,419 B1 | 12/2005 | Kantrowitz |
| 6,980,984 B1 | 12/2005 | Huffman et al. |
| 7,058,648 B1 | 6/2006 | Lightfoot et al. |
| 7,086,028 B1 | 8/2006 | Davis et al. |
| 7,089,541 B2 | 8/2006 | Ungar |
| 7,168,039 B2 | 1/2007 | Bertram |
| 7,174,377 B2 | 2/2007 | Bernard et al. |
| 7,188,100 B2 | 3/2007 | De Bellis et al. |
| 7,194,680 B1 | 3/2007 | Roy et al. |
| 7,213,030 B1 | 5/2007 | Jenkins |
| 7,373,669 B2 | 5/2008 | Eisen |
| 7,383,053 B2 | 6/2008 | Kent et al. |
| 7,392,254 B1 | 6/2008 | Jenkins |
| 7,403,942 B1 | 7/2008 | Bayliss |
| 7,441,182 B2 | 10/2008 | Beilinson et al. |
| 7,441,219 B2 | 10/2008 | Perry et al. |
| 7,451,397 B2 | 11/2008 | Weber et al. |
| 7,461,158 B2 | 12/2008 | Rider et al. |
| 7,523,100 B1 | 4/2009 | Bionda et al. |
| 7,529,734 B2 | 5/2009 | Dirisala |
| 7,574,409 B2 | 8/2009 | Patinkin |
| 7,596,285 B2 | 9/2009 | Brown |
| 7,617,232 B2 | 11/2009 | Gabbert et al. |
| 7,627,489 B2 | 12/2009 | Schaeffer et al. |
| 7,652,622 B2 | 1/2010 | Hansen et al. |
| 7,706,817 B2 | 4/2010 | Bamrah et al. |
| 7,725,547 B2 | 5/2010 | Albertson et al. |
| 7,739,246 B2 | 6/2010 | Mooney et al. |
| 7,747,648 B1 | 6/2010 | Kraft et al. |
| 7,756,843 B1 | 7/2010 | Palmer |
| 7,757,220 B2 | 7/2010 | Griffith et al. |
| 7,765,489 B1 | 7/2010 | Shah et al. |
| 7,783,658 B1 | 8/2010 | Bayliss |
| 7,805,457 B1 | 9/2010 | Viola et al. |
| 7,814,102 B2 | 10/2010 | Miller |
| 7,877,421 B2 | 1/2011 | Berger et al. |
| 7,880,921 B2 | 2/2011 | Dattilo et al. |
| 7,899,796 B1 | 3/2011 | Borthwick et al. |
| 7,912,842 B1 | 3/2011 | Bayliss |
| 7,917,376 B2 | 3/2011 | Bellin et al. |
| 7,941,321 B2 | 5/2011 | Greenstein et al. |
| 7,941,336 B1 | 5/2011 | Robin-Jan |
| 7,945,470 B1 | 5/2011 | Cohen et al. |
| 7,966,199 B1 | 5/2011 | Frasher |
| 7,958,147 B1 | 6/2011 | Turner et al. |
| 7,962,495 B2 | 6/2011 | Jain et al. |
| 8,010,507 B2 | 8/2011 | King et al. |
| 8,028,894 B2 | 10/2011 | Lapstun et al. |
| 8,036,971 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,073,857 B2 | 12/2011 | Sreekanth |
| 8,117,022 B2 | 2/2012 | Linker |
| 8,126,848 B2 | 2/2012 | Wagner |
| 8,135,679 B2 | 3/2012 | Bayliss |
| 8,135,719 B2 | 3/2012 | Bayliss |
| 8,147,715 B2 | 4/2012 | Bruckhaus et al. |
| 8,191,005 B2 | 5/2012 | Baier et al. |
| 8,214,490 B1 | 7/2012 | Vos et al. |
| 8,229,902 B2 | 7/2012 | Vishniac et al. |
| 8,266,168 B2 | 9/2012 | Bayliss |
| 8,290,838 B1 | 10/2012 | Thakur et al. |
| 8,301,904 B1 | 10/2012 | Gryaznov |
| 8,302,855 B2 | 11/2012 | Ma et al. |
| 8,312,546 B2 | 11/2012 | Alme |
| 8,321,943 B1 | 11/2012 | Walters et al. |
| 8,347,398 B1 | 1/2013 | Weber |
| 8,364,642 B1 | 1/2013 | Garrod |
| 8,386,377 B1 | 2/2013 | Xiong et al. |
| 8,392,556 B2 * | 3/2013 | Goulet .................... G06Q 10/06 709/223 |
| 8,402,047 B1 | 3/2013 | Mangini et al. |
| 8,429,527 B1 | 4/2013 | Arbogast |
| 8,447,674 B2 | 5/2013 | Choudhuri et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,495,077 B2 | 7/2013 | Bayliss |
| 8,498,969 B2 | 7/2013 | Bayliss |
| 8,521,135 B2 | 8/2013 | Cryderman |
| 8,527,949 B1 | 9/2013 | Pleis et al. |
| 8,554,653 B2 | 10/2013 | Falkenborg et al. |
| 8,554,719 B2 | 10/2013 | McGrew |
| 8,560,413 B1 | 10/2013 | Quarterman et al. |
| 8,589,273 B2 | 11/2013 | Creeden et al. |
| 8,600,872 B1 | 12/2013 | Yan |
| 8,601,326 B1 | 12/2013 | Kim |
| 8,639,552 B1 | 1/2014 | Chen et al. |
| 8,682,969 B1 | 3/2014 | Sahasi et al. |
| 8,688,573 B1 | 4/2014 | Rukonic et al. |
| 8,726,379 B1 | 5/2014 | Stiansen et al. |
| 8,732,574 B2 | 5/2014 | Burr et al. |
| 8,739,059 B2 | 5/2014 | Rabenold et al. |
| 8,744,890 B1 | 6/2014 | Bernier |
| 8,762,870 B2 | 6/2014 | Robotham et al. |
| 8,788,405 B1 | 7/2014 | Sprague et al. |
| 8,788,407 B1 | 7/2014 | Singh et al. |
| 8,799,313 B2 | 8/2014 | Satlow |
| 8,807,948 B2 | 8/2014 | Luo et al. |
| 8,812,444 B2 | 8/2014 | Garrod et al. |
| 8,812,960 B1 | 8/2014 | Sun et al. |
| 8,818,892 B1 | 8/2014 | Sprague et al. |
| 8,838,538 B1 | 9/2014 | Landau et al. |
| 8,849,254 B2 | 9/2014 | Bolon et al. |
| 8,855,999 B1 | 10/2014 | Elliot |
| 8,903,717 B2 | 12/2014 | Elliot |
| 8,924,388 B2 | 12/2014 | Elliot et al. |
| 8,924,389 B2 | 12/2014 | Elliot et al. |
| 8,930,874 B2 | 1/2015 | Duff et al. |
| 8,938,434 B2 | 1/2015 | Jain et al. |
| 8,938,686 B1 * | 1/2015 | Erenrich ............... G06F 3/0484 715/771 |
| 8,949,164 B1 | 2/2015 | Mohler |
| 8,984,390 B2 | 3/2015 | Aymeloglu et al. |
| 9,009,827 B1 | 4/2015 | Albertson et al. |
| 9,037,407 B2 | 5/2015 | Thompson |
| 9,043,894 B1 | 5/2015 | Dennison et al. |
| 9,058,315 B2 | 6/2015 | Burr et al. |
| 9,100,428 B1 | 8/2015 | Visbal |
| 9,105,000 B1 | 8/2015 | White et al. |
| 9,123,086 B1 | 9/2015 | Freeland et al. |
| 9,129,219 B1 | 9/2015 | Robertson et al. |
| 9,135,658 B2 | 9/2015 | Sprague et al. |
| 9,165,100 B2 | 10/2015 | Begur et al. |
| 9,165,299 B1 | 10/2015 | Stowe et al. |

(56) References Cited

U.S. PATENT DOCUMENTS

| | | |
|---|---|---|
| 9,177,344 B1 | 11/2015 | Singh et al. |
| 9,171,334 B1 | 12/2015 | Visbal et al. |
| 9,202,249 B1 | 12/2015 | Cohen et al. |
| 9,230,060 B2 | 1/2016 | Friedlander et al. |
| 9,230,280 B1 | 1/2016 | Maag et al. |
| 9,256,664 B2 | 2/2016 | Chakerian et al. |
| 2002/0032677 A1 | 3/2002 | Moregenthaler et al. |
| 2002/0035590 A1 | 3/2002 | Eibach et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2002/0194058 A1 | 12/2002 | Eldering |
| 2002/0194119 A1 | 12/2002 | Wright et al. |
| 2002/0196229 A1 | 12/2002 | Chen et al. |
| 2003/0033228 A1 | 2/2003 | Bosworth-Davies |
| 2003/0036848 A1 | 2/2003 | Sheha et al. |
| 2003/0036927 A1 | 2/2003 | Bowen |
| 2003/0061132 A1* | 3/2003 | Yu, Sr. .................. G06Q 30/02 705/30 |
| 2003/0074368 A1 | 4/2003 | Schuetze et al. |
| 2003/0088438 A1 | 5/2003 | Maughan et al. |
| 2003/0093401 A1 | 5/2003 | Czahowski et al. |
| 2003/0093755 A1 | 5/2003 | O'Carroll |
| 2003/0097330 A1 | 5/2003 | Hillmer et al. |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0152277 A1 | 8/2003 | Hall et al. |
| 2003/0171942 A1 | 9/2003 | Gaito |
| 2003/0177112 A1 | 9/2003 | Gardner |
| 2003/0182313 A1 | 9/2003 | Federwisch et al. |
| 2003/0212718 A1 | 11/2003 | Tester |
| 2003/0227746 A1 | 12/2003 | Sato |
| 2004/0003009 A1 | 1/2004 | Wilmot |
| 2004/0006523 A1 | 1/2004 | Coker |
| 2004/0034570 A1 | 2/2004 | Davis |
| 2004/0044648 A1 | 3/2004 | Anfindsen et al. |
| 2004/0083466 A1 | 4/2004 | Dapp et al. |
| 2004/0088177 A1 | 5/2004 | Travis et al. |
| 2004/0111480 A1 | 6/2004 | Yue |
| 2004/0117387 A1 | 6/2004 | Civetta et al. |
| 2004/0153418 A1 | 8/2004 | Hanweck |
| 2004/0153451 A1 | 8/2004 | Philips et al. |
| 2004/0203380 A1 | 10/2004 | Hamdi et al. |
| 2004/0205492 A1 | 10/2004 | Newsome |
| 2004/0205524 A1 | 10/2004 | Richter et al. |
| 2004/0210763 A1 | 10/2004 | Jonas |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0086207 A1 | 4/2005 | Heuer et al. |
| 2005/0091186 A1 | 4/2005 | Alon |
| 2005/0097441 A1 | 5/2005 | Herbach et al. |
| 2005/0102328 A1 | 5/2005 | Ring et al. |
| 2005/0108063 A1 | 5/2005 | Madill, Jr. et al. |
| 2005/0125436 A1 | 6/2005 | Mudunuri et al. |
| 2005/0125715 A1 | 6/2005 | Di Franco et al. |
| 2005/0131935 A1 | 6/2005 | O'Leary et al. |
| 2005/0154628 A1 | 7/2005 | Eckart et al. |
| 2005/0154769 A1 | 7/2005 | Eckart et al. |
| 2005/0210409 A1 | 9/2005 | Jou |
| 2005/0222928 A1 | 10/2005 | Steier et al. |
| 2005/0262512 A1 | 11/2005 | Schmidt et al. |
| 2006/0010130 A1 | 1/2006 | Leff et al. |
| 2006/0026120 A1 | 2/2006 | Carolan et al. |
| 2006/0026561 A1 | 2/2006 | Bauman et al. |
| 2006/0031779 A1 | 2/2006 | Theurer et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0080139 A1 | 4/2006 | Mainzer |
| 2006/0080283 A1 | 4/2006 | Shipman |
| 2006/0080316 A1 | 4/2006 | Gilmore et al. |
| 2006/0095521 A1 | 5/2006 | Patinkin |
| 2006/0116991 A1 | 6/2006 | Calderwood |
| 2006/0129746 A1 | 6/2006 | Porter |
| 2006/0136513 A1 | 6/2006 | Ngo et al. |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0155654 A1 | 7/2006 | Plessis et al. |
| 2006/0178915 A1 | 8/2006 | Chao |
| 2006/0178954 A1 | 8/2006 | Thukral et al. |
| 2006/0206235 A1 | 9/2006 | Shakes et al. |
| 2006/0218206 A1 | 9/2006 | Bourbonnais et al. |
| 2006/0218637 A1 | 9/2006 | Thomas et al. |
| 2006/0218941 A1 | 9/2006 | Grossman et al. |
| 2006/0250764 A1 | 11/2006 | Howarth et al. |
| 2006/0253502 A1 | 11/2006 | Raman et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0011304 A1 | 1/2007 | Error |
| 2007/0038646 A1 | 2/2007 | Thota |
| 2007/0043686 A1 | 2/2007 | Teng et al. |
| 2007/0043744 A1 | 2/2007 | Carro |
| 2007/0061752 A1 | 3/2007 | Cory |
| 2007/0067285 A1 | 3/2007 | Blume |
| 2007/0106582 A1 | 5/2007 | Baker et al. |
| 2007/0113164 A1 | 5/2007 | Hansen et al. |
| 2007/0118547 A1 | 5/2007 | Gupta et al. |
| 2007/0130541 A1 | 6/2007 | Louch et al. |
| 2007/0136095 A1 | 6/2007 | Weinstein |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0168871 A1 | 7/2007 | Jenkins |
| 2007/0178501 A1 | 8/2007 | Rabinowitz et al. |
| 2007/0185850 A1 | 8/2007 | Walters et al. |
| 2007/0185867 A1 | 8/2007 | Maga et al. |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0233756 A1 | 10/2007 | D'Souza et al. |
| 2007/0245339 A1 | 10/2007 | Bauman et al. |
| 2007/0250491 A1 | 10/2007 | Olszak et al. |
| 2007/0271317 A1 | 11/2007 | Carmel |
| 2007/0284433 A1 | 12/2007 | Domenica et al. |
| 2007/0294200 A1 | 12/2007 | Au |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0007618 A1 | 1/2008 | Yuasa |
| 2008/0016155 A1 | 1/2008 | Khalatian |
| 2008/0040275 A1 | 2/2008 | Paulsen et al. |
| 2008/0091693 A1 | 4/2008 | Murthy |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0133567 A1 | 6/2008 | Ames et al. |
| 2008/0140387 A1 | 6/2008 | Linker |
| 2008/0148398 A1 | 6/2008 | Mezack et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195672 A1 | 8/2008 | Hamel et al. |
| 2008/0208735 A1 | 8/2008 | Balet et al. |
| 2008/0222295 A1 | 9/2008 | Robinson et al. |
| 2008/0228467 A1 | 9/2008 | Womack et al. |
| 2008/0249820 A1 | 10/2008 | Pathria et al. |
| 2008/0249983 A1 | 10/2008 | Meisels et al. |
| 2008/0255973 A1 | 10/2008 | El Wade et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0288425 A1 | 11/2008 | Posse et al. |
| 2008/0313132 A1 | 12/2008 | Hao et al. |
| 2008/0313243 A1 | 12/2008 | Poston et al. |
| 2009/0005070 A1 | 1/2009 | Forstall et al. |
| 2009/0018940 A1 | 1/2009 | Wang et al. |

(56) References Cited

U.S. PATENT DOCUMENTS

| | | |
|---|---|---|
| 2009/0024505 A1 | 1/2009 | Patel et al. |
| 2009/0031401 A1 | 1/2009 | Cudich et al. |
| 2009/0043801 A1 | 2/2009 | LeClair et al. |
| 2009/0044279 A1 | 2/2009 | Crawford et al. |
| 2009/0055487 A1 | 2/2009 | Moraes et al. |
| 2009/0082997 A1 | 3/2009 | Tokman et al. |
| 2009/0083184 A1 | 3/2009 | Eisen |
| 2009/0089651 A1 | 4/2009 | Herberger et al. |
| 2009/0094270 A1 | 4/2009 | Alirez et al. |
| 2009/0106178 A1 | 4/2009 | Chu |
| 2009/0106242 A1 | 4/2009 | McGrew et al. |
| 2009/0112678 A1 | 4/2009 | Luzardo |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0138790 A1 | 5/2009 | Larcheveque et al. |
| 2009/0143052 A1 | 6/2009 | Bates et al. |
| 2009/0150868 A1 | 6/2009 | Chakra et al. |
| 2009/0156231 A1 | 6/2009 | Versteeg et al. |
| 2009/0157732 A1 | 6/2009 | Hao et al. |
| 2009/0164387 A1 | 6/2009 | Armstrong et al. |
| 2009/0172821 A1 | 7/2009 | Daira et al. |
| 2009/0177962 A1 | 7/2009 | Gusmorino et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0199106 A1 | 8/2009 | Jonsson et al. |
| 2009/0248757 A1 | 10/2009 | Havewala et al. |
| 2009/0249244 A1 | 10/2009 | Robinson et al. |
| 2009/0254970 A1 | 10/2009 | Agarwal et al. |
| 2009/0254971 A1 | 10/2009 | Herz et al. |
| 2009/0265105 A1 | 10/2009 | Davis et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0315679 A1 | 12/2009 | Bauchot et al. |
| 2009/0318775 A1 | 12/2009 | Michelson et al. |
| 2009/0319418 A1 | 12/2009 | Herz |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradeteanu et al. |
| 2010/0057622 A1 | 3/2010 | Faith et al. |
| 2010/0070842 A1 | 3/2010 | Aymeloglu et al. |
| 2010/0070844 A1 | 3/2010 | Aymeloglu et al. |
| 2010/0076813 A1* | 3/2010 | Ghosh ............... G06Q 30/0205 705/7.34 |
| 2010/0703531 | 3/2010 | Aymeloglu et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0100963 A1 | 4/2010 | Mahaffey |
| 2010/0106611 A1 | 4/2010 | Paulsen et al. |
| 2010/0114817 A1 | 5/2010 | Gilbert et al. |
| 2010/0114887 A1 | 5/2010 | Conway et al. |
| 2010/0121817 A1 | 5/2010 | Meyer et al. |
| 2010/0125546 A1 | 5/2010 | Barrett et al. |
| 2010/0131502 A1 | 5/2010 | Fordham |
| 2010/0145909 A1 | 6/2010 | Ngo |
| 2010/0161735 A1 | 6/2010 | Sharma |
| 2010/0169237 A1 | 7/2010 | Howard |
| 2010/0173619 A1 | 7/2010 | Hua et al. |
| 2010/0185691 A1 | 7/2010 | Irmak et al. |
| 2010/0185984 A1 | 7/2010 | Wright et al. |
| 2010/0191563 A1 | 7/2010 | Schlaifer et al. |
| 2010/0191884 A1 | 7/2010 | Holenstein et al. |
| 2010/0204983 A1 | 8/2010 | Chung et al. |
| 2010/0214117 A1 | 8/2010 | Hazzani |
| 2010/0223260 A1 | 9/2010 | Wu |
| 2010/0223543 A1 | 9/2010 | Marston |
| 2010/0235915 A1 | 9/2010 | Memon et al. |
| 2010/0238174 A1 | 9/2010 | Haub et al. |
| 2010/0262688 A1 | 10/2010 | Hussain et al. |
| 2010/0262901 A1 | 10/2010 | DiSalvo |
| 2010/0280851 A1 | 11/2010 | Merkin |
| 2010/0281458 A1 | 11/2010 | Paladino et al. |
| 2010/0306029 A1 | 12/2010 | Jolley |
| 2010/0306285 A1 | 12/2010 | Shah et al. |
| 2010/0306713 A1 | 12/2010 | Geisner et al. |
| 2010/0306722 A1 | 12/2010 | LeHoty et al. |
| 2010/0312837 A1 | 12/2010 | Bodapati et al. |
| 2010/0313239 A1 | 12/2010 | Chakra et al. |
| 2010/0330801 A1 | 12/2010 | Rouh |
| 2011/0004498 A1 | 1/2011 | Readshaw |
| 2011/0022312 A1 | 1/2011 | McDonough et al. |
| 2011/0047540 A1 | 2/2011 | Williams et al. |
| 2011/0061013 A1 | 3/2011 | Billicki et al. |
| 2011/0066497 A1 | 3/2011 | Gopinath et al. |
| 2011/0074788 A1 | 3/2011 | Regan et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce et al. |
| 2011/0093440 A1 | 4/2011 | Asakura et al. |
| 2011/0099133 A1 | 4/2011 | Chang et al. |
| 2011/0131122 A1 | 6/2011 | Griffin et al. |
| 2011/0153384 A1 | 6/2011 | Horne et al. |
| 2011/0158469 A1 | 6/2011 | Mastykarz et al. |
| 2011/0161409 A1 | 6/2011 | Nair et al. |
| 2011/0167493 A1 | 7/2011 | Song et al. |
| 2011/0173093 A1 | 7/2011 | Psota et al. |
| 2011/0178842 A1 | 7/2011 | Rane et al. |
| 2011/0179048 A1 | 7/2011 | Satlow |
| 2011/0202557 A1 | 8/2011 | Atsmon et al. |
| 2011/0208565 A1* | 8/2011 | Ross ............... G06Q 10/0639 705/7.38 |
| 2011/0208822 A1 | 8/2011 | Rathod |
| 2011/0213655 A1 | 9/2011 | Henkin |
| 2011/0218955 A1 | 9/2011 | Tang |
| 2011/0219450 A1 | 9/2011 | Mcdougal et al. |
| 2011/0225482 A1 | 9/2011 | Chan et al. |
| 2011/0225650 A1 | 9/2011 | Margolies et al. |
| 2011/0231223 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz et al. |
| 2011/0252282 A1 | 10/2011 | Meek et al. |
| 2011/0258216 A1 | 10/2011 | Supakkul et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine et al. |
| 2011/0307382 A1 | 12/2011 | Siegel |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004894 A1 | 1/2012 | Butler et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0013684 A1 | 1/2012 | Lucia |
| 2012/0022945 A1 | 1/2012 | Falkenborg et al. |
| 2012/0032975 A1 | 2/2012 | Koch |
| 2012/0036434 A1 | 2/2012 | Oberstein |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084135 A1 | 4/2012 | Nissan et al. |
| 2012/0084184 A1 | 4/2012 | Raleigh et al. |
| 2012/0084287 A1 | 4/2012 | Lakshminarayan et al. |
| 2012/0084866 A1 | 4/2012 | Stolfo |
| 2012/0123989 A1 | 5/2012 | Yu et al. |
| 2012/0131512 A1 | 5/2012 | Takeuchi et al. |
| 2012/0150578 A1 | 6/2012 | Mangat et al. |
| 2012/0159362 A1 | 6/2012 | Brown et al. |
| 2012/0166929 A1 | 6/2012 | Henderson et al. |

(56) References Cited

U.S. PATENT DOCUMENTS

| | | |
|---|---|---|
| 2012/0173381 A1 | 7/2012 | Smith |
| 2012/0188252 A1 | 7/2012 | Law |
| 2012/0191446 A1 | 7/2012 | Binsztok et al. |
| 2012/0197657 A1 | 8/2012 | Prodanovich |
| 2012/0197660 A1 | 8/2012 | Prodanovich |
| 2012/0215784 A1 | 8/2012 | King et al. |
| 2012/0215898 A1 | 8/2012 | Shah et al. |
| 2012/0216106 A1 | 8/2012 | Casey |
| 2012/0221553 A1 | 8/2012 | Wittmer et al. |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0254129 A1 | 10/2012 | Wheeler et al. |
| 2012/0268269 A1 | 10/2012 | Doyle |
| 2012/0284670 A1 | 11/2012 | Kashik et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323888 A1 | 12/2012 | Osann, Jr. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006947 A1 | 1/2013 | Akinyemi et al. |
| 2013/0013642 A1 | 1/2013 | Klein et al. |
| 2013/0016106 A1 | 1/2013 | Yip et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0054306 A1 | 2/2013 | Bhalla et al. |
| 2013/0057551 A1 | 3/2013 | Ebert et al. |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0110746 A1 | 5/2013 | Ahn |
| 2013/0124193 A1 | 5/2013 | Holmberg |
| 2013/0132348 A1 | 5/2013 | Garrod |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0160120 A1 | 6/2013 | Malaviya et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0185245 A1 | 7/2013 | Anderson |
| 2013/0185307 A1 | 7/2013 | El-Yaniv et al. |
| 2013/0196614 A1 | 8/2013 | Pahlevani |
| 2013/0197925 A1 | 8/2013 | Blue |
| 2013/0211985 A1 | 8/2013 | Clark et al. |
| 2013/0226318 A1 | 8/2013 | Procyk |
| 2013/0226879 A1 | 8/2013 | Talukder et al. |
| 2013/0226944 A1 | 8/2013 | Baid et al. |
| 2013/0232045 A1 | 9/2013 | Tai et al. |
| 2013/0235749 A1 | 9/2013 | Cho et al. |
| 2013/0238616 A1 | 9/2013 | Rose et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246597 A1 | 9/2013 | Iizawa et al. |
| 2013/0208565 A1 | 10/2013 | Castellanos et al. |
| 2013/0262171 A1 | 10/2013 | Solodko et al. |
| 2013/0262497 A1 | 10/2013 | Case et al. |
| 2013/0263019 A1* | 10/2013 | Castellanos ............ G06Q 50/01 715/753 |
| 2013/0276799 A1 | 10/2013 | Davidson et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318594 A1 | 11/2013 | Hoy et al. |
| 2013/0339218 A1 | 12/2013 | Subramanian et al. |
| 2014/0006109 A1 | 1/2014 | Callioni et al. |
| 2014/0006404 A1 | 1/2014 | McGrew et al. |
| 2014/0012796 A1 | 1/2014 | Petersen et al. |
| 2014/0032506 A1 | 1/2014 | Hoey et al. |
| 2014/0040371 A1 | 2/2014 | Gurevich et al. |
| 2014/0058763 A1 | 2/2014 | Zizzamia et al. |
| 2014/0058914 A1 | 2/2014 | Song et al. |
| 2014/0068487 A1 | 3/2014 | Steiger et al. |
| 2014/0081652 A1 | 3/2014 | Klindworth |
| 2014/0089339 A1* | 3/2014 | Siddiqui ............... G06F 17/303 707/769 |
| 2014/0095509 A1 | 4/2014 | Patton |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0129936 A1 | 5/2014 | Richards |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0208281 A1 | 7/2014 | Ming |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0258246 A1 | 9/2014 | Lo Faro et al. |
| 2014/0258827 A1 | 9/2014 | Gormish et al. |
| 2014/0302783 A1 | 10/2014 | Aiuto |
| 2014/0310282 A1 | 10/2014 | Sprague et al. |
| 2014/0344230 A1 | 11/2014 | Krause et al. |
| 2014/0351070 A1 | 11/2014 | Christner et al. |
| 2014/0357299 A1 | 12/2014 | Xu et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0026622 A1 | 1/2015 | Roaldson et al. |
| 2015/0046481 A1 | 2/2015 | Elliot |
| 2015/0073929 A1 | 3/2015 | Psota et al. |
| 2015/0073954 A1 | 3/2015 | Braff |
| 2015/0080012 A1 | 3/2015 | Sprague et al. |
| 2015/0089353 A1 | 3/2015 | Folkening |
| 2015/0095773 A1 | 4/2015 | Gonsalves et al. |
| 2015/0100897 A1 | 4/2015 | Sun et al. |
| 2015/0100907 A1* | 4/2015 | Erenrich ............... G06F 3/0484 715/765 |
| 2015/0101062 A1* | 4/2015 | Silver ................. G06F 21/6254 726/26 |
| 2015/0106379 A1 | 4/2015 | Elliot et al. |
| 2015/0135256 A1 | 5/2015 | Hoy et al. |
| 2015/0178825 A1 | 6/2015 | Huerta et al. |
| 2015/0186483 A1 | 7/2015 | Tappan et al. |
| 2015/0188872 A1 | 7/2015 | White |
| 2015/0212663 A1 | 7/2015 | Papale et al. |
| 2015/0235334 A1 | 8/2015 | Wang et al. |
| 2015/0254220 A1 | 9/2015 | Burr et al. |
| 2015/0331919 A1 | 11/2015 | Freeland et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0034470 A1 | 2/2016 | Sprague et al. |
| 2016/0048937 A1 | 2/2016 | Mathura et al. |
| 2016/0055501 A1 | 2/2016 | Mukherjee et al. |
| 2016/0062555 A1 | 3/2016 | Ward et al. |

FOREIGN PATENT DOCUMENTS

| | | |
|---|---|---|
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102014213036 | 1/2015 |
| EP | 1191463 A2 | 3/2002 |
| EP | 1672527 | 6/2006 |
| EP | 2400448 A1 | 12/2011 |

(56) References Cited

FOREIGN PATENT DOCUMENTS

| | | |
|---|---|---|
| EP | 2487610 | 8/2012 |
| EP | 2555153 A1 | 2/2013 |
| EP | 2778913 | 9/2014 |
| EP | 2778914 | 9/2014 |
| EP | 2816513 A1 | 12/2014 |
| EP | 2858018 | 4/2015 |
| EP | 2869211 | 5/2015 |
| EP | 2889814 | 7/2015 |
| EP | 2892197 | 7/2015 |
| EP | 2911078 A2 | 8/2015 |
| EP | 2916276 A1 | 9/2015 |
| EP | 2963577 A1 | 1/2016 |
| EP | 2963595 | 1/2016 |
| EP | 2988258 | 2/2016 |
| EP | 2993595 | 3/2016 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2001/025906 | 4/2001 |
| WO | WO 2001/088750 | 11/2001 |
| WO | WO-2004038547 A2 | 5/2004 |
| WO | WO 2005/0116851 | 12/2005 |
| WO | WO 2007/133206 | 11/2007 |
| WO | WO-2008011728 A1 | 1/2008 |
| WO | WO-2008113059 A1 | 9/2008 |
| WO | WO 2009/051987 | 4/2009 |
| WO | WO 2010/030913 | 3/2010 |
| WO | WO 2010/030914 | 3/2010 |
| WO | WO 2010/030919 | 3/2010 |
| WO | WO 2012/119008 | 9/2012 |
| WO | WO-2013126280 A1 | 8/2013 |

OTHER PUBLICATIONS

An overview of Business Intelligence Technology—By Chaudhuri et al. Communications of the ACM Aug. 2011, vol. 54, No. 8.*
A Scheme for Analyzing Electronic Payment Systems—By Ferreira et a. Brasil 1997.*
"A Real-World Problem of Matching Records," Nov. 2006, <http://groupweb.upf.es/bd-web/slides/ullman.pdf> pp. 1-16.
"A Tour of Pinboard," <http://pinboard.in/tour> as printed May 15, 2014 in 6 pages.
Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Bluttman et al., "Excel Formulas and Functions for Dummies," 2005, Wiley Publishing, Inc., pp. 280, 284-286.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Cohn et al., "Semi-supervised Clustering with User Feedback," Constrained Clustering: Advances in Algorithms, Theory, and Applications 4.1, 2003, pp. 17-32.
Conner, Nancy, "Google Apps: The Missing Manual," May 1, 2008, pp. 15.
Countly Mobile Analytics, <http://count.ly/> Printed Jul. 18, 2013 in 9 pages.
Delicious, <http://delicious.com/> as printed May 15, 2014 in 1 page.
Distimo—App Analytics, <http://www.distimo.com/app-analytics> Printed Jul. 18, 2013 in 5 pages.
"E-MailRelay," <http://web.archive.org/web/20080821175021/http://emailrelay.sourceforge.net/> Aug. 21, 2008, pp. 2.
Flurry Analytics, <http://www.flurry.com/> Printed Jul. 18, 2013 in 14 pages.
Galliford, Miles, "SnagIt Versus Free Screen Capture Software: Critical Tools for Website Owners," <http://www.subhub.com/articles/free-screen-capture-software>, Mar. 27, 2008, pp. 11.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
JetScreenshot.com, "Share Screenshots via Internet in Seconds," <http://web.archive.org/web/20130807164204/http://www.jetscreenshot.com/>, Aug. 7, 2013, pp. 1.
Johnson, Maggie "Introduction to YACC and Bison".
Johnson, Steve, "Access 2013 on demand," Access 2013 on Demand, May 9, 2013, Que Publishing.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Kwout, <http://web.archive.org/web/20080905132448/http://www.kwout.com/> Sep. 5, 2008, pp. 2.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.

(56) References Cited

OTHER PUBLICATIONS

Microsoft Windows, "Microsoft Windows Version 2002 Print Out 2," 2002, pp. 1-6.
Mixpanel—Mobile Analytics, <https://mixpanel.com/> Printed Jul. 18, 2013 in 13 pages.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
Open Web Analytics (OWA), <http://www.openwebanalytics.com/> Printed Jul. 19, 2013 in 5 pages.
O'Reilly.com, <http://oreilly.com/digitalmedia/2006/01/01/mac-os-x-screenshot-secrets.html> published Jan. 1, 2006 in 10 pages.
Piwik—Free Web Analytics Software. <http://piwik.org/> Printed Jul. 19, 2013 in18 pages.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Sekine et al., "Definition, Dictionaries and Tagger for Extended Named Entity Hierarchy," May 2004, pp. 1977-1980.
Sigrist et al., "PROSITE, a Protein Domain Database for Functional Characterization and Annotation," Nucleic Acids Research 38.Suppl 1, 2010, pp. D161-D166.
Schroder, Stan, "15 Ways to Create Website Screenshots," <http://mashable.com/2007/08/24/web-screenshots/>, Aug. 24, 2007, pp. 2.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines," M. Marinaro and R. Tagliaferri (Eds.): Wirn Vietri 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Notice of Allowance for U.S. Appl. No. 14/265,637 dated Feb. 13, 2015.
Notice of Allowance for U.S. Appl. No. 14/479,863 dated Mar. 31, 2015.
Notice of Allowance for U.S. Appl. No. 14/225,084 dated May 4, 2015.
Notice of Allowance for U.S. Appl. No. 14/304,741 dated Apr. 7, 2015.
Official Communication for U.S. Appl. No. 14/225,160 dated Jul. 29, 2014.
Official Communication for U.S. Appl. No. 14/304,741 dated Aug. 6, 2014.
Official Communication for U.S. Appl. No. 14/225,084 dated Sep. 2, 2014.
Official Communication for U.S. Appl. No. 14/225,006 dated Sep. 10, 2014.
Official Communication for U.S. Appl. No. 14/451,221 dated Oct. 21, 2014.
Official Communication for U.S. Appl. No. 14/225,160 dated Oct. 22, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/225,160 dated Feb. 11, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/304,741 dated Mar. 3, 2015.
Official Communication for U.S. Appl. No. 14/571,098 dated Mar. 11, 2015.
Official Communication for U.S. Appl. No. 13/669,274 dated May 6, 2015.
Official Communication for U.S. Appl. No. 14/225,160 dated May 20, 2015.
Official Communication for U.S. Appl. No. 14/463,615 dated May 21, 2015.
Official Communication for U.S. Appl. No. 12/556,307 dated Jun. 9, 2015.
Official Communication for U.S. Appl. No. 14/014,313 dated Jun. 18, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 12/556,321 dated Jul. 7, 2015.
Official Communication for U.S. Appl. No. 14/552,336 dated Jul. 20, 2015.
Official Communication for U.S. Appl. No. 14/676,621 dated Jul. 30, 2015.
Official Communication for U.S. Appl. No. 14/571,098 dated Aug. 5, 2015.
Official Communication for U.S. Appl. No. 14/225,160 dated Aug. 12, 2015.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014203669 dated May 29, 2015.
European Search Report for European Patent Application No. 09813700.3 dated Apr. 3, 2014.

(56) References Cited

OTHER PUBLICATIONS

Extended European Search Report for European Patent Application No. 14158958.0 dated Jun. 3, 2014.
Extended European Search Report for European Patent Application No. 14158977.0 dated Jun. 10, 2014.
Official Communication for European Patent Application No. 14187996.5 dated Feb. 12, 2015.
Official Communication for European Patent Application No. 14158977.0 dated Apr. 16, 2015.
Official Communication for European Patent Application No. 14158958.0 dated Apr. 16, 2015.
Official Communication for European Patent Application No. 14200298.9 dated May 12, 2015.
Official Communication for European Patent Application No. 14191540.5 dated May 27, 2015.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1411984.6 dated Dec. 22, 2014.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for Netherlands Patent Application No. 2013134 dated Apr. 20, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 628161 dated Aug. 25, 2014.
Wikipedia, "Multimap," Jan. 1, 2013, https://en.wikipedia.org/w/index.php?title=Multimap&oldid=530800748.
Notice of Allowance for U.S. Appl. No. 14/319,161, dated May 4, 2015.
Notice of Allowance for U.S. Appl. No. 14/323,935 dated Oct. 1, 2015.
Notice of Allowance for U.S. Appl. No. 14/552,336 dated Nov. 3, 2015.
Notice of Allowance for U.S. Appl. No. 12/556,307 dated Jan. 4, 2016.
Notice of Allowance for U.S. Appl. No. 14/746,671 dated Jan. 21, 2016.
Notice of Allowance for U.S. Appl. No. 14/094,418 dated Jan. 25, 2016.
Notice of Allowance for U.S. Appl. No. 14/676,621 dated Feb. 10, 2016.
Notice of Allowance for U.S. Appl. No. 12/556,307 dated Mar. 21, 2016.
Notice of Acceptance for Australian Patent Application No. 2013251186 dated Nov. 6, 2015.
Notice of Acceptance for Australian Patent Application No. 2014203669 dated Jan. 21, 2016.
Official Communication for U.S. Appl. No. 12/556,307 dated Sep. 2, 2011.
Official Communication for U.S. Appl. No. 12/556,307 dated Feb. 13, 2012.
Official Communication for U.S. Appl. No. 12/556,307 dated Oct. 1, 2013.
Official Communication for U.S. Appl. No. 12/556,307 dated Mar. 14, 2014.
Official Communication for U.S. Appl. No. 14/571,098 dated Aug. 24, 2015.
Official Communication for U.S. Appl. No. 13/669,274 dated Aug. 26, 2015.
Official Communication for U.S. Appl. No. 14/225,006 dated Sep. 2, 2015.
Official Communication for U.S. Appl. No. 14/631,633 dated Sep. 10, 2015.
Official Communication for U.S. Appl. No. 14/463,615 dated Sep. 10, 2015.
Official Communication for U.S. Appl. No. 14/225,084 dated Sep. 11, 2015.
Official Communication for U.S. Appl. No. 14/562,524 dated Sep. 14, 2015.
Official Communication for U.S. Appl. No. 14/813,749 dated Sep. 28, 2015.
Official Communication for U.S. Appl. No. 14/746,671 dated Sep. 28, 2015.
Official Communication for U.S. Appl. No. 14/141,252 dated Oct. 8, 2015.
Official Communication for U.S. Appl. No. 13/827,491 dated Oct. 9, 2015.
Official Communication for U.S. Appl. No. 14/483,527 dated Oct. 28, 2015.
Official Communication for U.S. Appl. No. 14/676,621 dated Oct. 29, 2015.
Official Communication for U.S. Appl. No. 14/571,098 dated Nov. 10, 2015.
Official Communication for U.S. Appl. No. 14/562,524 dated Nov. 10, 2015.
Official Communication for U.S. Appl. No. 14/746,671 dated Nov. 12, 2015.
Official Communication for U.S. Appl. No. 14/842,734 dated Nov. 19, 2015.
Official Communication for U.S. Appl. No. 14/306,138 dated Dec. 3, 2015.
Official Communication for U.S. Appl. No. 14/222,364 dated Dec. 9, 2015.
Official Communication for U.S. Appl. No. 14/463,615 dated Dec. 9, 2015.
Official Communication for U.S. Appl. No. 14/225,006 dated Dec. 21, 2015.
Official Communication for U.S. Appl. No. 14/306,147 dated Dec. 24, 2015.
Official Communication for U.S. Appl. No. 14/306,138 dated Dec. 24, 2015.
Official Communication for U.S. Appl. No. 14/883,498 dated Dec. 24, 2015.
Official Communication for U.S. Appl. No. 14/225,084 dated Jan. 4, 2016.
Official Communication for U.S. Appl. No. 14/526,066 dated Jan. 21, 2016.
Official Communication for U.S. Appl. No. 14/306,154 dated Feb. 1, 2016.
Official Communication for U.S. Appl. No. 14/871,465 dated Feb. 9, 2016.
Official Communication for U.S. Appl. No. 14/741,256 dated Feb. 9, 2016.
Official Communication for U.S. Appl. No. 14/562,524 dated Feb. 18, 2016.

(56) References Cited

OTHER PUBLICATIONS

Official Communication for U.S. Appl. No. 14/841,338 dated Feb. 18, 2016.
Official Communication for U.S. Appl. No. 14/715,834 dated Feb. 19, 2016.
Official Communication for U.S. Appl. No. 14/571,098 dated Feb. 23, 2016.
Official Communication for U.S. Appl. No. 12/556,321 dated Feb. 25, 2016.
Official Communication for U.S. Appl. No. 14/014,313 dated Feb. 26, 2016.
Official Communication for U.S. Appl. No. 14/961,481 dated Mar. 2, 2016.
Official Communication for U.S. Appl. No. 14/306,147 dated Mar. 4, 2016.
Official Communication for U.S. Appl. No. 14/306,138 dated Mar. 17, 2016.
Official Communication for U.S. Appl. No. 14/306,154 dated Mar. 17, 2016.
Official Communication for U.S. Appl. No. 14/883,498 dated Mar. 17, 2016.
Official Communication for U.S. Appl. No. 14/463,615 dated Mar. 21, 2016.
Official Communication for Australian Patent Application No. 2013251186 dated Mar. 12, 2015.
Official Communication for European Patent Application No. 14200246.8 dated May 29, 2015.
Official Communication for Canadian Patent Application No. 2831660 dated Jun. 9, 2015.
Official Communication for Netherlands Patent Application No. 2011729 dated Aug. 13, 2015.
Official Communication for European Patent Application No. 12181585.6 dated Sep. 4, 2015.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application 2012438 dated Sep. 21, 2015.
Official Communication for European Patent Application No. 15181419.1 dated Sep. 29, 2015.
Official Communication for European Patent Application No. 15184764.7 dated Dec. 14, 2015.
Official Communication for Great Britain Patent Application No. 1411984.6 dated Jan. 8, 2016.
Official Communication for European Patent Application No. 15188106.7 dated Feb. 3, 2016.
Official Communication for European Patent Application No. 15190307.7 dated Feb. 19, 2016.
Official Communication for European Patent Application No. 14158977.0 dated Mar. 11, 2016.
Official Communication for European Patent Application No. 14158958.0 dated Mar. 11, 2016.
"U.S. Appl. No. 13/181,392, Notice of Allowance dated Jan. 22, 2015", 9 pgs.
"U.S. Appl. No. 13/181,392, Notice of Allowance dated Aug. 28, 2014", 23 pgs.
"U.S. Appl. No. 13/831,199, Final Office Action dated Oct. 6, 2015", 17 pgs.
"U.S. Appl. No. 13/831,199, Non Final Office Action dated Jun. 3, 2015", 23 pgs.
"U.S. Appl. No. 13/838,815, Notice of Allowance dated Jan. 29, 2015", 10 pgs.
"U.S. Appl. No. 13/838,815, Notice of Allowance dated Jun. 19, 2015", 31 pgs.
"U.S. Appl. No. 13/839,026, Non Final Office Action dated Aug. 4, 2015", 66 pgs.
"U.S. Appl. No. 13/839,026, Restriction Requirement dated Apr. 2, 2015", 5 pgs.
"U.S. Appl. No. 14/027,118, Non Final Office Action dated May 12, 2015", 18 pgs.
"U.S. Appl. No. 14/027,118, Non Final Office Action dated Sep. 16, 2015", 20 pgs.
"U.S. Appl. No. 14/027,118, Notice of Allowance dated Mar. 4, 2016", 12 pgs.
"U.S. Appl. No. 14/088,251, Examiner Interview Summary dated Jun. 30, 2015", 3 pgs.
"U.S. Appl. No. 14/088,251, Final Office Action dated May 20, 2015", 24 pgs.
"U.S. Appl. No. 14/088,251, Non Final Office Action dated Feb. 12, 2015", 25 pgs.
"U.S. Appl. No. 14/088,251, Non Final Office Action dated Aug. 26, 2015", 22 pgs.
"U.S. Appl. No. 14/139,628, Notice of Allowance dated Jun. 24, 2015", 8 pgs.
"U.S. Appl. No. 14/139,640, Notice of Allowance dated Jun. 17, 2015", 11 pgs.
"U.S. Appl. No. 14/139,713, Notice of Allowance dated Jun. 12, 2015", 9 pgs.
"U.S. Appl. No. 14/196,814, Non Final Office Action dated May 5, 2015", 24 pgs.
"U.S. Appl. No. 14/196,814, Non Final Office Action dated Oct. 7, 2015", 20 pgs.
"U.S. Appl. No. 14/251,485, First Action Interview Pre-Interview Communication dated Oct. 1, 2015", 8 pgs.
"U.S. Appl. No. 14/264,445, Final Office Action dated Apr. 17, 2015", 15 pgs.
"U.S. Appl. No. 14/264,445, Notice of Allowance dated May 14, 2015", 10 pgs.
"U.S. Appl. No. 14/278,963, Final Office Action dated Jan. 30, 2015", 6 pgs.
"U.S. Appl. No. 14/278,963, Notice of Allowance dated Sep. 2, 2015", 6 pgs.
"U.S. Appl. No. 14/319,161, Final Office Action dated Jan. 23, 2015", 21 pgs.
"U.S. Appl. No. 14/334,232, Non Final Office Action dated Jul. 10, 2015", 7 pgs.
"U.S. Appl. No. 14/334,232, Notice of Allowance dated Nov. 10, 2015", 9 pgs.
"U.S. Appl. No. 14/473,552, Examiner Interview Summary dated Feb. 24, 2015", 21 pgs.
"U.S. Appl. No. 14/473,552, Notice of Allowance dated Jul. 24, 2015", 8 pgs.
"U.S. Appl. No. 14/473,860, Notice of Allowance dated Jan. 5, 2015", 19 pgs.
"U.S. Appl. No. 14/486,991, Non Final Office Action dated Mar. 10, 2015", 23 pgs.
"U.S. Appl. No. 14/486,991, Notice of Allowance dated May 1, 2015", 5 pgs.
"U.S. Appl. No. 14/487,342, First Action Interview Pre-Interview Communication dated Apr. 23, 2015", 9 pgs.
"U.S. Appl. No. 14/487,342, Notice of Allowance dated Sep. 23, 2015", 26 pgs.
"U.S. Appl. No. 14/518,757, Final Office Action dated Jul. 20, 2015", 37 pgs.
"U.S. Appl. No. 14/518,757, First Action Interview Pre-Interview Communication dated Apr. 2, 2015", 13 pgs.
"U.S. Appl. No. 14/518,757, Non Final Office Action dated Dec. 1, 2015", 32 pgs.
"U.S. Appl. No. 14/579,752, Final Office Action dated Aug. 19, 2015", 35 pgs.
"U.S. Appl. No. 14/579,752, First Action interview Pre-Interview Communication dated May 26, 2015", 24 pgs.
"U.S. Appl. No. 14/579,753, Non Final Office Action dated Dec. 9, 2015", 15 pgs.
"U.S. Appl. No. 14/580,218, Final Office Action dated Jan. 7, 2016", 16 pgs.
"U.S. Appl. No. 14/581,920, First Action Interview Pre-Interview Communication dated Mar. 1, 2016"4 pgs.
"U.S. Appl. No. 14/616,080, Notice of Allowance dated Apr. 2, 2015", 34 pgs.

(56) References Cited

OTHER PUBLICATIONS

"U.S. Appl. No. 14/639,606, Final Office Action dated Oct. 16, 2015", 54 pgs.

"U.S. Appl. No. 14/639,606, First Action Interview Pre-Interview Communication dated May 18, 2015", 9 pgs.

"U.S. Appl. No. 14/639,606, First Action Interview Pre-Interview Communication dated Jul. 24, 2015", 9 pgs.

"U.S. Appl. No. 14/690,905, Non Final Office Action dated Oct. 7, 2015", 11 pgs.

"U.S. Appl. No. 14/690,905, Notice of Allowance dated Nov. 23, 2015", 9 pgs.

"U.S. Appl. No. 14/726,353, Final Office Action dated Mar. 1, 2016", 48 pgs.

"U.S. Appl. No. 14/726,353, First Action Interview Pre-Interview Communication dated Sep. 10, 2015", 31 pgs.

"U.S. Appl. No. 14/800,447, First Action Interview Pre-Interview Communication dated Dec. 10, 2015", 26 pgs.

"U.S. Appl. No. 14/857,071, Non Final Office Action dated Mar. 2, 2016", 36 pgs.

"U.S. Appl. No. 14/857,071, Restriction Requirement dated Dec. 11, 2015", 8 pgs.

"Determining business object structure", IBM, [Online]. Retrieved from the Internet: <URL: http://www.ibm.com/support/knowledgecenter/SSBTEG_4.3.0/com.ibm.wbia_developer.doc/doc/businessobject_dev/busobj_d25.htm>, (2004), 9 pgs.

"E-Security Begins with Sound Security Policies", Symantec Corporation; Symantec Enterprise Security, (Jun. 2001), 12 pgs.

"European Application Serial No. 14159447.3, Extended European Search Report dated Nov. 25, 2014", 6 pgs.

"European Application Serial No. 14159447.3, Non Final Office Action dated Jan. 8, 2015", 2 pgs.

"European Application Serial No. 14159535.5, Extended European Search Report dated May 22, 2014", 8 pgs.

"European Application Serial No. 15155845.9, Extended European Search Report dated Oct. 6, 2015", 5 pgs.

"European Application Serial No. 15156004.2, Extended European Search Report dated Aug. 24, 2015", 5 pgs.

"European Application Serial No. 15157642.8, Extended European Search Report dated Jul. 20, 2015", 6 pgs.

"European Application Serial No. 15175151.8, Extended European Search Report dated Nov. 25, 2015", 8 pgs.

"European Application Serial No. 15180515.7, Extended European Search Report dated Dec. 14, 2015", 7 pgs.

1 "Great Britain Application Serial No. 1404457.2, Office Action dated Aug. 14, 2014", 8 pgs.

"New Zealand Application Serial No. 622501, Non Final Office Action dated Apr. 1, 2014", 2 pgs.

"New Zealand Application Serial No. 622501, Non Final Office Action dated Jun. 5, 2014", 1 pg.

"Potential Money Laundering Warning Signs", (Accessed 2003), 6 pgs.

Alfred, Rayner, "Summarizing Relational Data Using Semi-Supervised Genetic Algorithm-Based Clustering Techniques", Journal of Computer Science 6 (7), (2010), 775-784.

Butkovic, Asmir, et al., "Using Whois Based Geolocation and Google Maps API for support cybercrime investigations", Recent Advances in Telecommunications and Circuits, 194-200.

Chaudhuri, Surajit, et al., "An Overview of Business Intelligence Technology", Communications of the ACM, vol. 54, No. 8., (Aug. 2011), 88-98.

Levi, Micheal, "Money Laundering Risks and E-Gaming: A European Overview and Assessment", [Online]. Retrieved from the Internet: <URL: http://www.egba.eu/pdf/Levi_Final_Money_Laundering_Risks_egaming%20280909.pdf>, (2009), 30 pgs.

Nolan, Richard, et al., "MCARTA: A Malicious Code Automated Run-Time Analysis Framework", Homeland Security, 2012 IEEE Conference, (2012), 13-17.

Perdisci, Roberto, et al., "Behavioral Clustering of HTTP-Based Malware and Signature Generation Using Malicious Network Traces", USENIX, (Mar. 18, 2010), 1-14.

Shah, Chintan, "Periodic Connections to Control Server Offer New Way to Detect Botnets", McAfee Labs, [Online]. Retrieved from the Internet: <URL: blogs.mcafee.com/mcafee-labs/periodic-links-to-control-server-offer-new-way-to-detect-botnets>, (Oct. 24, 2013), 6 pgs.

Shi, Liang, et al., "A Scalable Implementation of Malware Detection Based on Network Connection Behaviors", 2013 International Conference on Cyber-Enabled Distributed Computing and Knowledge Discovery, IEEE, (Oct. 10, 2013), 59-66.

Wiggerts, T. A, et al., "Using Clustering Algorithms in Legacy Systems Remodularization", Proceedings of the Fourth Working Conference on Reverse Engineering, (1997), 33-43.

Xiv, Golem, "A word about banks and the laundering of drug money", http://www.golemxiv.co.uk/2012/08/a-word-about-banks-and-the-laundering-of-drug-money/, (Aug. 18, 2012), 1-21.

\* cited by examiner

| Number | Consuming Entity ID (e.g. name or code) | Consuming Entity Location ||| | Provisioning Entity ID (e.g. name or code) | Provisioning Entity Location |||| | Type of Provisioning Entity (e.g., name or code) | Interaction Amount (e.g., in Dollars) | Time of Interaction ||
|---|---|---|---|---|---|---|---|---|---|---|---|---|---|
| | | State | City | Zip Code | Street Address | | State | City | Zip Code | Street Address | | | Date | Time |
| 1 | User 1 | California | Palo Alto | 94304 | 123 Main St | PE001 | California | Palo Alto | 94304 | 234 University Ave | Gas Station | 74.56 | 2013/11/23 | 10:32 |
| 2 | CE002 | California | Sunnyvale | 94085 | 123 Murphy St | Merchant 2 | Unknown | Unknown | Unknown | Unknown | Supermarket | 23.56 | 2013/10/15 | 11:23 |
| 3 | User 1 | California | Palo Alto | 94304 | 123 Main St | Merchant 2 | Unknown | Unknown | Unknown | Unknown | TPE123 | 32.11 | 2013/11/21 | 19:00 |
| 4 | User 3 | California | San Francisco | 94102 | 1000 Lombard St | Merchant 3 | California | San Francisco | 94102 | 123 Market St | Coffee Shop | 8.97 | 2013/10/20 | 17:05 |
| 5 | User 3 | Unknown | Unknown | Unknown | Unknown | Merchant 3 | California | San Francisco | 94102 | 123 Market St | Coffee Shop | 5.34 | 2013/11/03 | 8:03 |
| ... | | | | | | | | | | | | | | |
| 50,000,000,000 | User N | California | Beverly Hills | 90210 | 123 Wilshire Blvd | Merchant N | California | Beverly Hills | 90210 | 789 Wilshire Blvd | TPE789 | 89.23 | 2013/10/28 | 14:00 |

FIG. 4

METHODS AND SYSTEMS FOR ANALYZING ENTITY PERFORMANCE

CROSS-REFERENCE TO RELATED APPLICATIONS

This application claims the benefit of U.S. Provisional Patent Application No. 62/160,541, filed May 12, 2015, entitled "METHODS AND SYSTEMS FOR ANALYZING ENTITY PERFORMANCE," which is incorporated herein in its entirety.

BRIEF DESCRIPTION OF THE DRAWINGS

Reference will now be made to the accompanying drawings, which illustrate exemplary embodiments of the present disclosure and in which:

FIG. 4 is a block diagram of an exemplary data structure accessed in the process of analyzing entity performance, consistent with the embodiments of the present disclosure.

DETAILED DESCRIPTION OF EXEMPLARY EMBODIMENTS

Figure 1:
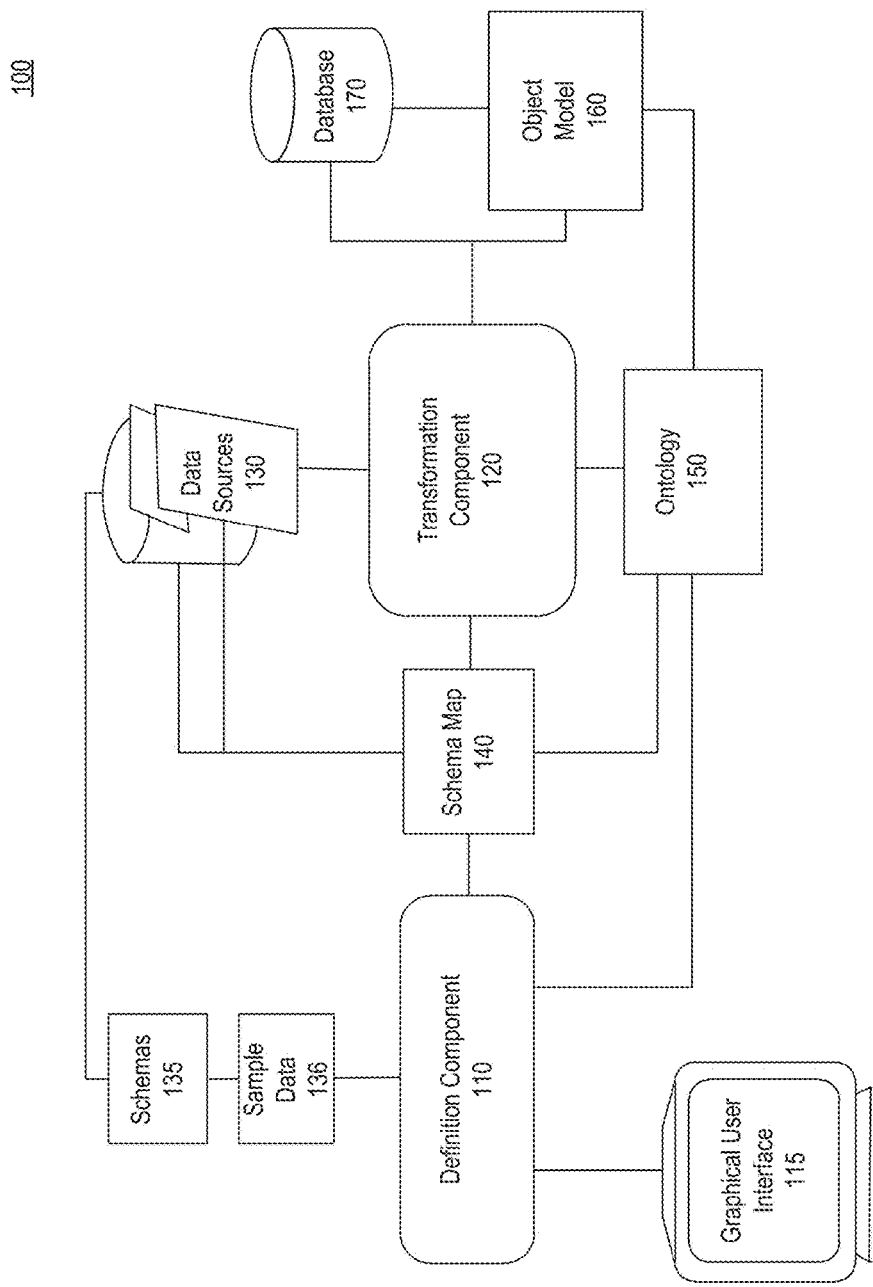
FIG. 1 illustrates, in block diagram form, an exemplary data fusion system for providing interactive data analysis, consistent with embodiments of the present disclosure.

Reference will now be made in detail to exemplary embodiments, the examples of which are illustrated in the accompanying drawings. Whenever possible, the same reference numbers will be used throughout the drawings to refer to the same or like parts.

Generally, embodiments of the invention relate to analyzing entity performance in real-time based on interactions (e.g., anonymized credit card or debit card transaction data) and potentially other data (e.g., merchant data). Types of interactions from which entity performance may be derived include, e.g., purchases made at a brick-and-mortar store or purchases made online. Large sets of interaction data may be filtered according to selectable criteria to provide, for example, information associated with the performance of a particular entity (e.g., a merchant). Such selectable criteria may include an amount spent at a particular location, times of purchases, time spent between purchases, types of merchants associated with purchase, demographics associated with a purchaser, purchaser identity, demographics associated with a location of a merchant, Merchant Category Codes (MCCs), types of products purchases, etc. In addition, the performance of the entity may be expressed in terms of tables, charts, graphs, or other visual aids, which illustrate performance in terms of revenue, wallet share, time, expenses, etc.

In some embodiments, data relating to the interactions may be stored in a real-time distributed computation environment that supports stream-oriented processing. For example, the data can be stored in a data structure using Hadoop's Distributed File System, Vertica™, or Amazon™ S3. In some embodiments, the data structure storing the interactions data may be incrementally updated at particular intervals by a data computation system, such as Apache's Spark™, providing a user with real-time or near real-time information about the interactions.

In one example, a first data stream including information associated with credit and debit card interactions is acquired at a data computation system and/or a data structure. This stream can include information relating to over three-hundred million transactions per day, for example. This stream can be divided into smaller streams. As an example, a particular interaction data stream may be divided into separate sub-streams, each based on a unique provisioning entity (e.g., a merchant). In addition, a second stream may be acquired that includes interaction information from a point-of-sale system. Different data streams or additional streams can also be acquired.

In some embodiments, the data streams can be segmented by a data computation system to include information associated with new customers (e.g., by determining whether the consuming entity, or information associated therewith, is included in the data structure), returning customers (e.g., by determining whether a consuming entity makes a purchase at a provisioning entity at least twice within a particular amount of time), determining a home location associated with an individual based on transaction data (e.g., anonymized credit card transaction data), local customers, and non-local customers. The aggregation of interaction information associated with these streams can be incrementally updated in the data structure in real-time, allowing a user to access a business portal and view a day-by-day, year-by-year, or even minute-by-minute break down of revenues generated, locations of interactions, etc.

Additional aspects relating to the invention may include different queries that can be run, and how they are registered with the data computation system. For example, in some embodiments the queries are registered with the system a priori in order to walk through a data set that is constantly being updated. For example, a query could be entered by a user into a graphical user interface and cause a data computation system to retrieve a plurality of merchants within a particular radius that sell pizza and have revenue over a particular amount for the instant day. Next, if a new merchant exceeds the queried amount later that day, as additional streams of information associated with interactions are received or otherwise become available, then that new merchant may be added to a table or other user interface in real-time such that someone using the system could see that the new merchant was also within the ambit of the predetermined query.

Figure 2:
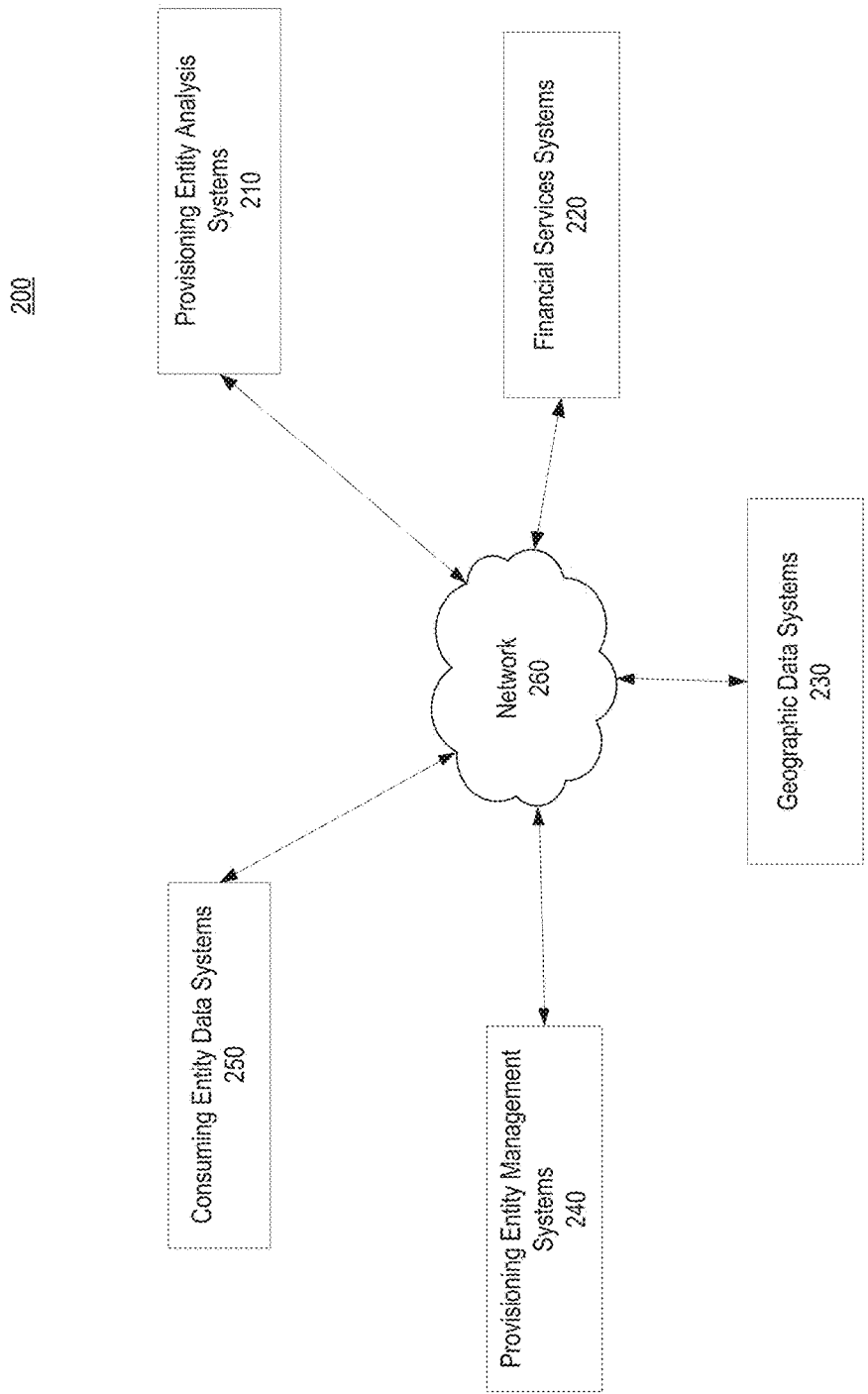
FIG. 2 is a block diagram of an exemplary system for analyzing performance of an entity, consistent with embodiments of the present disclosure.

FIG. 1 illustrates, in block diagram form, an exemplary data fusion system 100 for providing interactive data analysis, consistent with embodiments of the present disclosure. Among other things, data fusion system 100 facilitates transformation of one or more data sources, such as data sources 130 (e.g., financial services systems 220, geographic data systems 230, provisioning entity management systems 240 and/or consuming entity data systems 250, as shown in FIG. 2) into an object model 160 whose semantics are defined by an ontology 150. The transformation can be performed for a variety of reasons. For example, a database administrator can import data from data sources 130 into a database 170 for persistently storing object model 160. As another example, a data presentation component (not depicted) can transform input data from data sources 130 "on the fly" into object model 160. The object model 160 can then be utilized, in conjunction with ontology 150, for analysis through graphs and/or other data visualization techniques.

Data fusion system 100 comprises a definition component 110 and a translation component 120, both implemented by one or more processors of one or more computing devices or systems executing hardware and/or software-based logic for providing various functionality and features of the present disclosure, as described herein. As will be appreciated from the present disclosure, data fusion system 100 can comprise fewer or additional components that provide the various functionalities and features described herein. Moreover, the number and arrangement of the components of data fusion system 100 responsible for providing the various functionalities and features described herein can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued on Jun. 14, 2011, the entire contents of which are expressly incorporated herein by reference for all purposes. Consistent with certain embodiments disclosed in the '495 patent, a dynamic ontology may be used to create a database. To create a database ontology, one or more object types may be defined, where each object type includes one or more properties. The attributes of object types or property types of the ontology can be edited or modified at any time. And, for each property type, at least one parser definition may be created. The attributes of a parser definition can be edited or modified at any time.

In some embodiments, each property type is declared to be representative of one or more object types. A property type is representative of an object type when the property type is intuitively associated with the object type. Alternatively, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an Address property having a City component and a State component. An example of raw input data is "Los Angeles, Calif." An example parser definition specifies an association of imported input data to object property components as follows: {CITY}, {STATE}→Address:State, Address:City. In some embodiments, the association {CITY}, {STATE} is defined in a parser definition using regular expression symbology. The association {CITY}, {STATE} indicates that a city string followed by a state string, and separated by a comma, comprises valid input data for a property of type Address. In contrast, input data of "Los Angeles Calif." would not be valid for the specified parser definition, but a user could create a second parser definition that does match input data of "Los Angeles Calif." The definition Address:City, Address:State specifies that matching input data values map to components named "City" and "State" of the Address property. As a result, parsing the input data using the parser definition results in assigning the value "Los Angeles" to the Address:City component of the Address property, and the value "CA" to the Address:State component of the Address property.

According to some embodiments, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130; for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Based on the identified information, definition component 110 can generate a graphical user interface 115. Graphical user interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 115 features a visual workspace that visually depicts representations of the elements of ontology 150 for which mappings are defined in schema map 140.

In some embodiments, transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or alternatively include temporary data structures generated from underlying data sources via data extraction components, such as a result set returned from a database server executing a database query.

Schema map 140, ontology 150, and schemas 135 can be stored in any suitable structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. Alternatively, the elements of object model 160 are stored within database 170 in a different underlying format, such as in a series of object, property, and relationship tables in a relational database.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

Throughout this disclosure, reference will be made to an entity such as, for example, a provisioning entity and a consuming entity. It will be understood that a provisioning entity can include, for example, a merchant, a retail provisioning entity or the like, and a consuming entity can include, for example, a consumer user buying products or services from a provisioning entity. It will be understood that a consuming entity can represent either individual persons or can represent a group of persons (e.g., a group of persons living under one roof as part of a family). In some embodiments, a consuming entity can be a credit card number of an individual or a credit card number for an entire family sharing one credit card. It will also be understood that a provisioning entity can represent either the entity itself or individual persons involved with the entity.

In embodiments described herein, data fusion system 100 can provide a provisioning entity, such as a retail provisioning entity, to analyze information to identify behaviors to allow that provisioning entity to make more informed decisions. Such information can allow retail entities, such as a retail provisioning entity, to determine where to place their retail locations. Provisioning entities having more than one location (e.g., a merchant with a chain store or a franchise model) typically evaluate the performance of their locations and may adjust their business models or work flows when the locations under-perform. Typically, provisioning entities evaluate the performance of their locations based on period-to-period metrics. For example, a provisioning entity can evaluate a location's performance by comparing the current month's sales to the previous month's sales. In addition, provisioning entitles can evaluate each of its locations' performance using comparative analysis. For example, a provisioning entity might compare the sales at an area location with the sales at a second location. As provisioning entities generally measure the performance of its locations based on their own interaction data (e.g., the entity's sales across some or all of its locations), current methods of measuring performance do not consider sales made by competitors or demographic features of the areas of the provisioning entity's locations.

Since current performance evaluation methods do not consider the sales of competitors or the demographic features of the region of the provisioning entity location, measured performance may not represent the true performance of a provisioning entity. For instance, although a provisioning entity location in a low consumer spend capacity area might have less sales than a provisioning entity location in a high consumer spend capacity area, it may be performing better than what could be expected for that area in light of, for example, the low number of consumers residing in the area or the low income of the area. A performance of a provisioning entity at an area location can be adversely impacted by the close proximity of a second location of the provisioning entity, but the provisioning entity at the area location can be performing better than expected given the competition from the provisioning entity's second location. Conversely, while a provisioning entity location in a dense, high-income area might have the highest sales of all provisioning entity locations, it can still be under-performing because, for instance, consumer spend capacity is high and the provisioning entity location could generate more sales.

Consistent with embodiments of the present disclosure, the performance of provisioning entities can be analyzed based on how the provisioning entity is expected to perform given the location of the provisioning entity. For a given provisioning entity location, the disclosed embodiments may be implemented to consider, for example, consumer demographic features of the provisioning entity location's area and the proximity of competitors to the provisioning entity location (including the proximity of the provisioning entity's other close-by locations). In some embodiments, the provisioning entity can be a merchant. For purposes of illustration, exemplary embodiments for analyzing entity performance are described herein with reference to "merchants." The exemplary embodiments and techniques described herein, however, may be applied to other types of entities (e.g., service providers, governmental agencies, etc.) within the spirit and scope of this disclosure.

FIG. 2 is a block diagram of an exemplary system 200 for performing one or more operations for analyzing performance of a provisioning entity and/or a consuming entity, consistent with disclosed embodiments. In some embodiments, the provisioning entity is a merchant and system 200 can include provisioning entity analysis system 210, one or more financial services systems 220, one or more geographic data systems 230, one or more provisioning entity management systems 240, and one or more consuming entity data systems 250. The components and arrangement of the components included in system 200 can vary depending on the embodiment. For example, the functionality described below with respect to financial services systems 220 can be embodied in consuming entity data systems 250, or vice-versa. Thus, system 200 can include fewer or additional components that perform or assist in the performance of one or more processes to analyze provisioning entity's, consistent with the disclosed embodiments.

One or more components of system 200 can be computing systems configured to analyze provisioning entity performance. As further described herein, components of system 200 can include one or more computing devices (e.g., computer(s), server(s), etc.), memory storing data and/or software instructions (e.g., database(s), memory devices, etc.), and other appropriate computing components. In some embodiments, the one or more computing devices are configured to execute software or a set of programmable instructions stored on one or more memory devices to perform one or more operations, consistent with the disclosed embodiments. Components of system 200 can be configured to communicate with one or more other components of system 200, including provisioning entity analysis system 210, one or more financial services systems 220, one or more geographic data systems 230, one or more provisioning entity management systems 240, and one or more consumer data systems 250. In certain aspects, users can operate one or more components of system 200. The one or more users can be employees of, or associated with, the entity corresponding to the respective component(s) (e.g., someone authorized to use the underlying computing systems or otherwise act on behalf of the entity).

Figure 3:
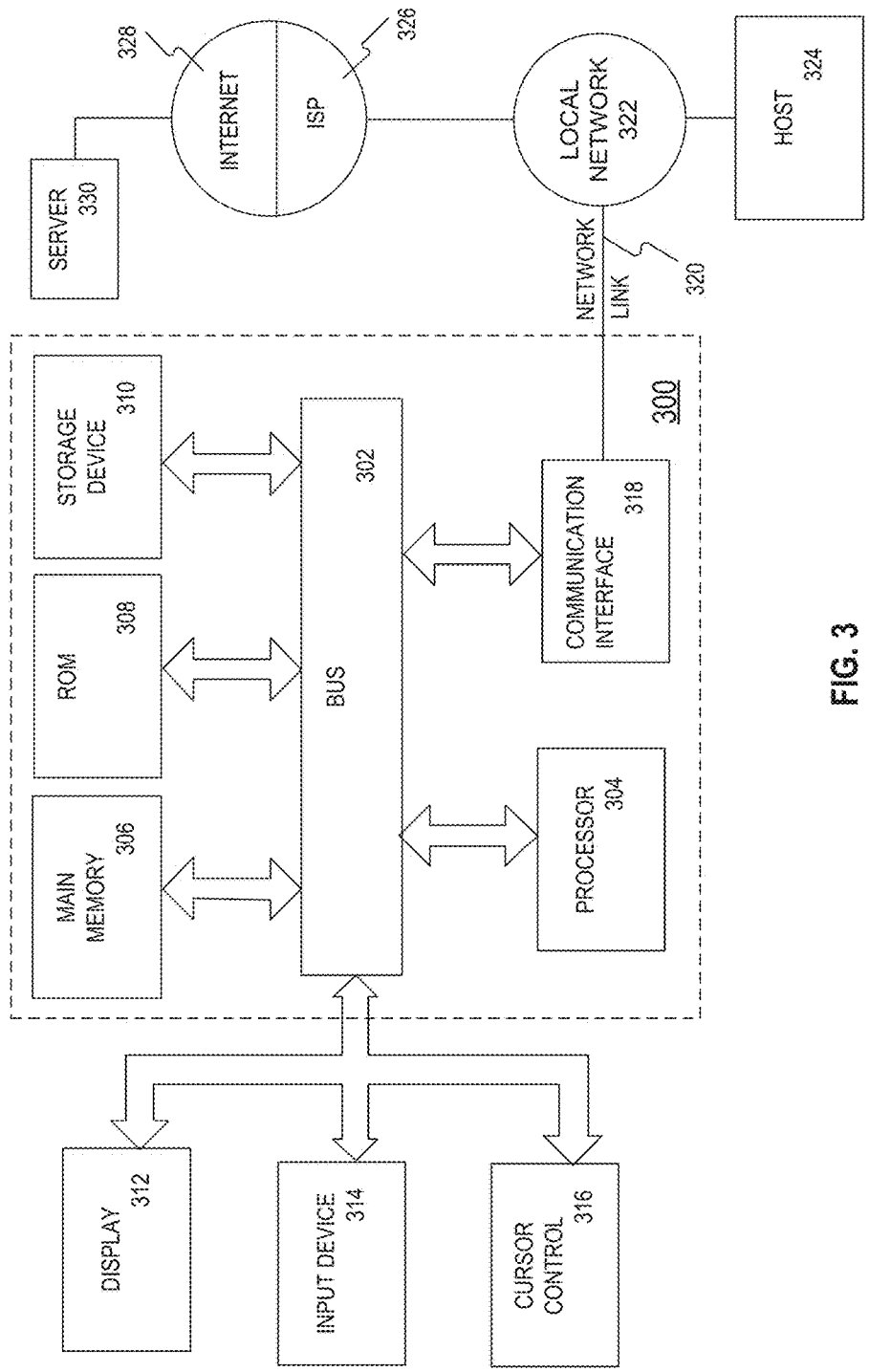
FIG. 3 is a block diagram of an exemplary computer system, consistent with embodiments of the present disclosure.

Provisioning entity analysis system 210 can be a computing system configured to analyze provisioning entity performance. For example, provisioning entity analysis system 210 can be a computer system configured to execute software or a set of programmable instructions that collect or receive financial interaction data, consumer data, and provisioning entity data and process it to determine the actual transaction amount of each transaction associated with the provisioning entity. Provisioning entity analysis system 210 can be configured, in some embodiments, to utilize, include, or be a data fusion system 100 (see, e.g., FIG. 1) to transform data from various data sources (such as, financial services systems 220, geographic data systems 230, provisioning entity management systems 240, and consuming entity data systems 250) for processing. In some embodiments, provisioning entity analysis system 210 can be implemented using a computer system 300, as shown in FIG. 3 and described below.

Provisioning entity analysis system 210 can include one or more computing devices (e.g., server(s)), memory storing data and/or software instructions (e.g., database(s), memory devices, etc.) and other known computing components. According to some embodiments, provisioning entity analysis system 210 can include one or more networked computers that execute processing in parallel or use a distributed computing architecture. Provisioning entity analysis system 210 can be configured to communicate with one or more components of system 200, and it can be configured to provide analysis of provisioning entities via an interface(s) accessible by users over a network (e.g., the Internet). For example, provisioning entity analysis system 210 can include a web server that hosts a web page accessible through network 260 by provisioning entity management systems 240. In some embodiments, provisioning entity analysis system 210 can include an application server configured to provide data to one or more client applications executing on computing systems connected to provisioning entity analysis system 210 via network 260.

In some embodiments, provisioning entity analysis system 210 can be configured to determine the actual sales for a provisioning entity or specific provisioning entity location by processing and analyzing data collected from one or more components of system 200. For example, provisioning entity analysis system 210 can determine that the Big Box Merchant store located at 123 Main St, in Burbank, Calif. is actually generating $60,000 of sales per month. Provisioning entity analysis system 210 can provide an analysis of a provisioning entity or provisioning entity location's performance based on a target for sales and the actual sales for the provisioning entity or provisioning entity location. For example, for the Big Box Merchant store located at 123 Main St., Burbank, Calif., the provisioning entity analysis system 210 can provide an analysis that the store is performing above expectations.

Provisioning entity analysis system 210 can, in some embodiments, generate a user interface communicating data related to one or more provisioning entities or provisioning entity locations. For example, in some embodiments, provisioning entity analysis system 210 includes a web server that generates HTML code, or scripts capable of generating HTML code, that can be displayed in a web browser executing on computing device. Provisioning entity analysis system 210 can also execute an application server that provides user interface objects to a client application executing on a computing device, or it can provide data that is capable of being displayed in a user interface in a client application executing on a computing device. In some embodiments, provisioning entity analysis system 210 can generate user interfaces that can be displayed within another user interface. For example, provisioning entity analysis system 210 can generate a user interface for display within a parent user interface that is part of a word processing application, a presentation development application, a web browser, or an illustration application, among others. In some embodiments, generating a user interface can include generating the code that when executed displays information (e.g., HTML) on the user interface. Alternatively, generating a user interface can include providing commands and/or data to a set of instructions that when executed render a user interface capable of being shown on a display connected to a computing device. In some embodiments, the user interface can include a map, indications of the provisioning entity locations on a map, and indications of the sales or interactions associated with the provisioning entity locations.

Referring again to FIG. 2, financial services system 220 can be a computing system associated with a financial service provider, such as a bank, credit card issuer, credit bureau, credit agency, or other entity that generates, provides, manages, and/or maintains financial service accounts for one or more users. Financial services system 220 can generate, maintain, store, provide, and/or process financial data associated with one or more financial service accounts. Financial data can include, for example, financial service account data, such as financial service account identification data, account balance, available credit, existing fees, reward points, user profile information, and financial service account interaction data, such as interaction dates, interaction amounts, interaction types, and location of interaction. In some embodiments, each interaction of financial data can include several categories of information associated with the interaction. For example, each interaction can include categories such as number category; consuming entity identification category; consuming entity location category; provisioning entity identification category; provisioning entity location category; type of provisioning entity category; interaction amount category; and time of interaction category, as described in FIG. 4. It will be appreciated that financial data can comprise either additional or fewer categories than the exemplary categories listed above. Financial services system 220 can include infrastructure and components that are configured to generate and/or provide financial service accounts such as credit card accounts, checking accounts, savings account, debit card accounts, loyalty or reward programs, lines of credit, and the like.

Geographic data systems 230 can include one or more computing devices configured to provide geographic data to other computing systems in system 200 such as provisioning entity analysis system 210. For example, geographic data systems 230 can provide geodetic coordinates when provided with a street address of vice-versa. In some embodiments, geographic data systems 230 exposes an application programming interface (API) including one or more methods or functions that can be called remotely over a network, such as network 260. According to some embodiments, geographic data systems 230 can provide information concerning routes between two geographic points. For example, provisioning entity analysis system 210 can provide two addresses and geographic data systems 230 can provide, in response, the aerial distance between the two addresses, the distance between the two addresses using roads, and/or a suggested route between the two addresses and the route's distance.

According to some embodiments, geographic data systems 230 can also provide map data to provisioning entity analysis system 210 and/or other components of system 200. The map data can include, for example, satellite or overhead images of a geographic region or a graphic representing a geographic region. The map data can also include points of interest, such as landmarks, malls, shopping centers, schools, or popular restaurants or retailers, for example.

Provisioning entity management systems 240 can be one or more computing devices configured to perform one or more operations consistent with disclosed embodiments. For example, provisioning entity management systems 240 can be a desktop computer, a laptop, a server, a mobile device (e.g., tablet, smart phone, etc.), or any other type of computing device configured to request provisioning entity analysis from provisioning entity analysis system 210. According to some embodiments, provisioning entity management systems 240 can comprise a network-enabled computing device operably connected to one or more other presentation devices, which can themselves constitute a computing system. For example, provisioning entity management systems 240 can be connected to a mobile device, telephone, laptop, tablet, or other computing device.

Provisioning entity management systems 240 can include one or more processors configured to execute software instructions stored in memory. Provisioning entity management systems 240 can include software or a set of programmable instructions that when executed by a processor performs known Internet-related communication and content presentation processes. For example, provisioning entity management systems 240 can execute software or a set of instructions that generates and displays interfaces and/or content on a presentation device included in, or connected to, provisioning entity management systems 240. In some embodiments, provisioning entity management systems 240 can be a mobile device that executes mobile device applications and/or mobile device communication software that allows provisioning entity management systems 240 to communicate with components of system 200 over network 260. The disclosed embodiments are not limited to any particular configuration of provisioning entity management systems 240.

Provisioning entity management systems 240 can be one or more computing systems associated with a provisioning entity that provides products (e.g., goods and/or services), such as a restaurant (e.g., Outback Steakhouse®, Burger King®, etc.), retailer (e.g., Amazon.com®, Target®, etc.), grocery store, mall, shopping center, service provider (e.g., utility company, insurance company, financial service provider, automobile repair services, movie theater, etc.), non-profit organization (ACLU™, AARP®, etc.) or any other type of entity that provides goods, services, and/or information that consuming entities (i.e., end-users or other business entities) can purchase, consume, use, etc. For ease of discussion, the exemplary embodiments presented herein relate to purchase interactions involving goods from retail provisioning entity systems. Provisioning entity management systems 240, however, is not limited to systems associated with retail provisioning entities that conduct business in any particular industry or field.

Provisioning entity management systems 240 can be associated with computer systems installed and used at a brick and mortar provisioning entity locations where a consumer can physically visit and purchase goods and services. Such locations can include computing devices that perform financial service interactions with consumers (e.g., Point of Sale (POS) terminal(s), kiosks, etc.). Provisioning entity management systems 240 can also include back- and/or front-end computing components that store data and execute software or a set of instructions to perform operations consistent with disclosed embodiments, such as computers that are operated by employees of the provisioning entity (e.g., back office systems, etc.). Provisioning entity management systems 240 can also be associated with a provisioning entity that provides goods and/or service via known online or e-commerce types of solutions. For example, such a provisioning entity can sell products via a website using known online or e-commerce systems and solutions to market, sell, and process online interactions. Provisioning entity management systems 240 can include one or more servers that are configured to execute stored software or a set of instructions to perform operations associated with a provisioning entity, including one or more processes associated with processing purchase interactions, generating interaction data, generating product data (e.g., SKU data) relating to purchase interactions, for example.

Consuming entity data systems 250 can include one or more computing devices configured to provide demographic data regarding consumers. For example, consuming entity data systems 250 can provide information regarding the name, address, gender, income level, age, email address, or other information about consumers. Consuming entity data systems 250 can include public computing systems such as computing systems affiliated with the U.S. Bureau of the Census, the U.S. Bureau of Labor Statistics, or FedStats, or it can include private computing systems such as computing systems affiliated with financial institutions, credit bureaus, social media sites, marketing services, or some other organization that collects and provides demographic data.

Network 260 can be any type of network or combination of networks configured to provide electronic communications between components of system 200. For example, network 260 can be any type of network (including infrastructure) that provides communications, exchanges information, and/or facilitates the exchange of information, such as the Internet, a Local Area Network, or other suitable connection(s) that enables the sending and receiving of information between the components of system 200. Network 260 may also comprise any combination of wired and wireless networks. In other embodiments, one or more components of system 200 can communicate directly through a dedicated communication link(s), such as links between provisioning entity analysis system 210, financial services system 220, geographic data systems 230, provisioning entity management systems 240, and consuming entity data systems 250.

As noted above, provisioning entity analysis system 210 can include a data fusion system (e.g., data fusion system 100) for organizing data received from one or more of the components of system 200.

FIG. 3 is a block diagram of an exemplary computer system 300, consistent with embodiments of the present disclosure. The components of system 200 such as provisioning entity analysis system 210, financial service systems 220, geographic data systems 230, provisioning entity management systems 240, and consuming entity data systems 250 may include the architecture based on or similar to that of computer system 300.

As illustrated in FIG. 3, computer system 300 includes a bus 302 or other communication mechanism for communicating information, and one or more hardware processors 304 (denoted as processor 304 for purposes of simplicity) coupled with bus 302 for processing information. Hardware processor 304 can be, for example, one or more general-purpose microprocessors or it can be a reduced instruction set of one or more microprocessors.

Computer system 300 also includes a main memory 306, such as a random access memory (RAM) or other dynamic storage device, coupled to bus 302 for storing information and instructions to be executed by processor 304. Main memory 306 also can be used for storing temporary variables or other intermediate information during execution of instructions to be executed by processor 304. Such instructions, after being stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc. is provided and coupled to bus 302 for storing information and instructions.

Computer system 300 can be coupled via bus 302 to a display 312, such as a cathode ray tube (CRT), liquid crystal display, or touch screen, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 300 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 300 can implement the techniques described herein using customized hard-wired logic, one or more ASICs or FPGAs, firmware and/or program logic which in combination with the computer system causes or programs computer system 300 to be a special-purpose machine. According to some embodiments, the operations, functionalities, and techniques and other features described herein are performed by computer system 300 in response to processor 304 executing one or more sequences of one or more instructions contained in main memory 306. Such instructions can be read into main memory 306 from another storage medium, such as storage device 310. Execution of the sequences of instructions contained in main memory 306 causes processor 304 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 310. Volatile media can include dynamic memory, such as main memory 306. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 302. Transmission media can also take the form of acoustic or light waves, such as those generated during radio-wave and infra-red data communications.

Various forms of media can be involved in carrying one or more sequences of one or more instructions to processor 304 for execution. For example, the instructions can initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 can also include a communication interface 318 coupled to bus 302. Communication interface 318 can provide a two-way data communication coupling to a network link 320 that can be connected to a local network 322. For example, communication interface 318 can be an integrated services digital network (ISDN) card, cable modem, satellite modem, or a modem to provide a data communication connection to a corresponding type of telephone line. As another example, communication interface 318 can be a local area network (LAN) card to provide a data communication connection to a compatible LAN. Wireless links can also be implemented. In any such implementation, communication interface 318 can send and receives electrical, electromagnetic or optical signals that carry digital data streams representing various types of information.

Network link 320 can typically provide data communication through one or more networks to other data devices. For example, network link 320 can provide a connection through local network 322 to a host computer 324 or to data equipment operated by an Internet Service Provider (ISP) 326. ISP 326 in turn can provide data communication services through the world wide packet data communication network now commonly referred to as the "Internet" 328. Local network 322 and Internet 328 can both use electrical, electromagnetic or optical signals that carry digital data streams. The signals through the various networks and the signals on network link 320 and through communication interface 318, which carry the digital data to and from computer system 300, can be example forms of transmission media.

Computer system 300 can send messages and receive data, including program code, through the network(s), network link 320 and communication interface 318. In the Internet example, a server 330 can transmit a requested code for an application program through Internet 328, ISP 326, local network 322 and communication interface 318. The received code can be executed by processor 304 as it is received, and/or stored in storage device 310, or other non-volatile storage for later execution. In some embodiments, server 330 can provide information for being displayed on a display.

FIG. 4 is a block diagram of an exemplary data structure 400, consistent with embodiments of the present disclosure. Data structure 400 can store data records associated with interactions involving multiple entities. Data structure 400 can be, for example, a database (e.g., database 170) that can store elements of an object model (e.g., object model 160). In some embodiments, data structure 400 can be a Relational Database Management System (RDBMS) that stores interaction data as sections of rows of data in relational tables. An RDBMS can be designed to efficiently return data for an entire row, or record, in as few operations as possible. An RDBMS can store data by serializing each row of data of data structure 400. For example, in an RDBMS, data associated with interaction 1 of FIG. 4 can be stored serially such that data associated with all categories of interaction 1 can be accessed in one operation.

Alternatively, data structure 400 can be a column-oriented database management system that stores data as sections of columns of data rather than rows of data. This column-oriented DBMS can have advantages, for example, for data warehouses, customer relationship management systems, and library card catalogs, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of data structure 400. For example, in a column-oriented DBMS, data associated with a category (e.g., consuming entity identification category 420) can be stored serially such that data associated with that category for all interactions of data structure 400 can be accessed in one operation.

As shown in FIG. 4, data structure 400 can comprise data associated with a very large number of interactions associated with multiple entities. For example, data structure 400 can include 50 billion or more interactions. In some embodiments, interactions associated with multiple entities can be referred to as transactions between multiple entities. Where appropriate, the terms interactions and transactions are intended to convey the same meaning and can be used interchangeably throughout this disclosure. While each interaction of data structure 400 is depicted as a separate row in FIG. 4, it will be understood that each such interaction can be represented by a column or any other known technique in the art. Each interaction data can include several categories of information. For example, the several categories can include, number category 410; consuming entity identification category 420; consuming entity location category 430; provisioning entity identification category 440; provisioning entity location category 450; type of provisioning entity category 460; interaction amount category 470; and time of interaction category 480. It will be understood that FIG. 4 is merely exemplary and that data structure 400 can include even more categories of information associated with an interaction.

Number category 410 can uniquely identify each interaction of data structure 400. For example, data structure 400 depicts 50 billion interactions as illustrated by number category 410 of the last row of data structure 400 as 50,000,000,000. In FIG. 4, each row depicting a interaction can be identified by an element number. For example, interaction number 1 can be identified by element 401; interaction number 2 can be identified by element 402; and so on such that interaction 50,000,000,000 can be identified by 499B. It will be understood that this disclosure is not limited to any number of interactions and further that this disclosure can extend to a data structure with more or fewer than 50 billion interactions. It is also appreciated that number category 410 need not exist in data structure 400.

Consuming entity identification category 420 can identify a consuming entity. In some embodiments, consuming entity identification category 420 can represent a name (e.g., User 1 for interaction 401; User N for interaction 499B) of the consuming entity. Alternatively, consuming entity identification category 420 can represent a code uniquely identifying the consuming entity (e.g., CE002 for interaction 402).

For example, the identifiers under the consuming entity identification category 420 can be a credit card number that can identify a person or a family, a social security number that can identify a person, a phone number or a MAC address associated with a cell phone of a user or family, or any other identifier.

Consuming entity location category 430 can represent a location information of the consuming entity. In some embodiments, consuming entity location category 430 can represent the location information by providing at least one of: a state of residence (e.g., state sub-category 432; California for element 401; unknown for interaction 405) of the consuming entity; a city of residence (e.g., city sub-category 434; Palo Alto for interaction 401; unknown for interaction 405) of the consuming entity; a zip code of residence (e.g., zip code sub-category 436; 94304 for interaction 401; unknown for interaction 405) of the consuming entity; and a street address of residence (e.g., street address sub-category 438; 123 Main St. for interaction 401; unknown for interaction 405) of the consuming entity.

Provisioning entity identification category 440 can identify a provisioning entity (e.g., a merchant or a coffee shop). In some embodiments, provisioning entity identification category 440 can represent a name of the provisioning entity (e.g., Merchant 2 for interaction 402). Alternatively, provisioning entity identification category 440 can represent a code uniquely identifying the provisioning entity (e.g., PE001 for interaction 401). Provisioning entity location category 450 can represent location information of the provisioning entity. In some embodiments, provisioning entity location category 450 can represent the location information by providing at least one of: a state where the provisioning entity is located (e.g., state sub-category 452; California for interaction 401; unknown for interaction 402); a city where the provisioning entity is located (e.g., city sub-category 454; Palo Alto for interaction 401; unknown for interaction 402); a zip code where the provisioning entity is located (e.g., zip code sub-category 456; 94304 for interaction 401; unknown for interaction 402); and a street address where the provisioning entity is located (e.g., street address sub-category 458; 234 University Ave. for interaction 401; unknown for interaction 402).

Type of provisioning entity category 460 can identify a type of the provisioning entity involved in each interaction. In some embodiments, type of provisioning entity category 460 of the provisioning entity can be identified by a category name customarily used in the industry (e.g., Gas Station for interaction 401) or by an identification code that can identify a type of the provisioning entity (e.g., TPE123 for interaction 403). Alternatively, type of the provisioning entity category 460 can include a merchant category code ("MCC") used by credit card companies to identify any business that accepts one of their credit cards as a form of payment. For example, MCC can be a four-digit number assigned to a business by credit card companies (e.g., American Express™, MasterCard™, VISA™) when the business first starts accepting one of their credit cards as a form of payment.

In some embodiments, type of provisioning entity category 460 can further include a sub-category (not shown in FIG. 4), for example, type of provisioning entity sub-category 461 that can further identify a particular sub-category of provisioning entity. For example, an interaction can comprise a type of provisioning entity category 460 as a hotel and type of provisioning entity sub-category 461 as either a bed and breakfast hotel or a transit hotel. It will be understood that the above-described examples for type of provisioning entity category 460 and type of provisioning entity sub-category 461 are non-limiting and that data structure 400 can include other kinds of such categories and sub-categories associated with an interaction.

Interaction amount category 470 can represent a transaction amount (e.g., $74.56 for interaction 401) involved in each interaction. Time of interaction category 480 can represent a time at which the interaction was executed. In some embodiments, time of interaction category 480 can be represented by a date (e.g., date sub-category 482; Nov. 23, 2013, for interaction 401) and time of the day (e.g., time sub-category 484; 10:32 AM local time for interaction 401). Time sub-category 484 can be represented in either military time or some other format. Alternatively, time sub-category 484 can be represented with a local time zone of either provisioning entity location category 450 or consuming entity location category 430.

In some embodiments, each interaction data can include categories of information including (not shown in FIG. 4), for example, consuming entity loyalty membership category, consuming entity credit card type category, consuming entity age category, consuming entity gender category, consuming entity income category, consuming entity with children category, product information category, and service information category.

Consuming entity loyalty membership category can represent whether the consuming entity is part of a loyalty membership program associated with a provisioning entity. For example, consuming entity loyalty membership category can represent that the consuming entity is a member of one of Costco™ membership programs including Goldstar Member™, Executive Member™, and Business Member™. Consuming entity credit card type category can represent the type of credit card used by the consuming entity for a particular interaction. For example, consuming entity credit card type category can indicate that the credit card used by the consuming entity for that particular interaction can be an American Express™, MasterCard™, VISA™, or Discover™ card. In some embodiments, consuming entity credit card type category can represent a kind of MasterCard™ (e.g., Gold MasterCard™ or Platinum MasterCard™) used for a particular interaction.

In some embodiments, consuming entity demographic information can be stored in each interaction. For example, consuming entity demographic information can include at least one of: consuming entity age category, consuming entity gender category, consuming entity income category, and consuming entity with children category. In some embodiments, consuming entity age category can represent age information associated with the consuming entity; consuming entity gender category can represent gender information (e.g., Male or Female) associated with the consuming entity; consuming entity income category can represent income information (e.g., greater than $100,000 per year) associated with the consuming entity; and consuming entity with children category can represent whether the consuming entity has any children under 18 or not. For example, if the consuming entity has children under 18, a positive indication can be stored and if the consuming entity does not has children under 18, a negative indication can be stored. In some embodiments, consuming entity with children category can store information representing a number of children associated with the consuming entity.

Product information category can represent information associated with a product that is involved in an interaction. For example, product information category can represent that the product involved in the interaction is a particular type of product based on a stock keeping unit ("SKU") of the product. In some embodiments, the product's SKU can be unique to a particular provisioning entity involved in that particular interaction. Alternatively, product information category can represent the product involved in the interaction with a at least one of a Universal Product Code, International Article Number, Global Trade Item Number, and Australian Product Number. Service information category can represent information associated with a service that is involved in an interaction. For example, service information category can represent that the service involved in the interaction is a particular type of service based on an SKU of the service. It will be appreciated that an SKU can uniquely represent either a product or a service. Some examples of services can be warranties, delivery fees, installation fees, and licenses.

Figure 5:
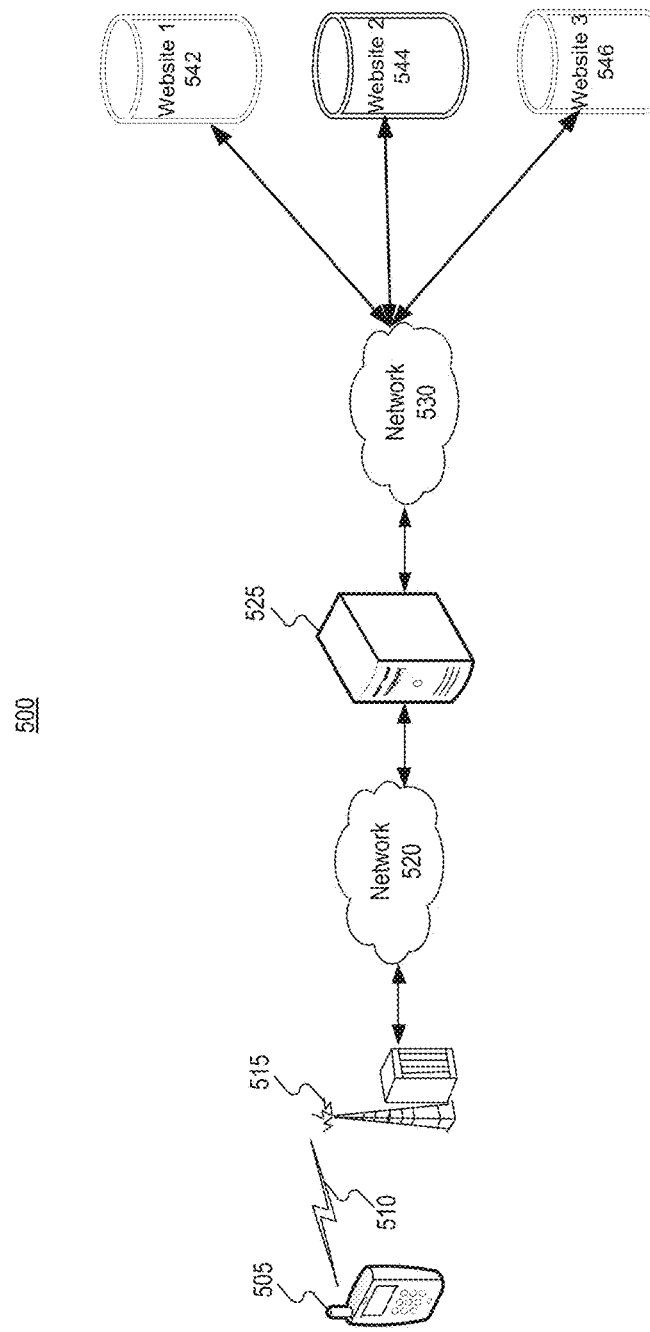
FIG. 5 is a block diagram of an exemplary scenario depicting a system for analyzing entity performance, consistent with the embodiments of the present disclosure.

FIG. 5 is a block diagram of an exemplary scenario depicting a system for analyzing entity performance, consistent with embodiments of the present disclosure. System 500 depicts a scenario where a consuming entity (e.g., user of cell phone 505) can attempt to access a service at one or more provisioning entities (e.g., Website 1 542, Website 2 544, and/or Website 3 546). To access one of the provisioning entities, the consuming entity can initiate an access request from cell phone 505. The access request can include a consuming entity identification such as, for example, a cell phone number or a MAC address associated with cell phone 505. The access request can then reach a cellular base station 515 through a communication link 510. It will be understood that communication link 510 can either be a wireless link (as shown in the exemplary embodiment of FIG. 5) or a wired link (not shown). Next, the access request can reach server 525 through network 520. Network 520 can be, for example, the Internet. In some embodiments, network 520 can be one of either a local area network, a wide area network, or an entity's intranet. Server 525 can be a server located at a service provider (e.g., Verizon Wireless™). Server 525 can be, in some embodiments, an authentication, authorization, and accounting server (AAA server). In some embodiments, server 525 can be a proxy server that can facilitate a communication between cell phone 505 and a server device at the provisioning entities (e.g., Website 1 542).

Access request can reach one of the provisioning entities after an authorization, authentication, and accounting process is complete. Access request can traverse to one of the provisioning entities through network 530. Network 530 can be similar to network 520, as described above. After the authorized and authenticated access request reaches one of the provisioning entities, the consuming entity is allowed to access the provisioning entities. In this exemplary embodiment, user of cell phone 505 can access either Website 1 542, Website 2 544, or Website 3 546, depending on details of the access request. For example, provisioning entities can be one of the websites Google™, Facebook™, and Twitter™.

After a consuming entity (e.g., user of cell phone 505 or cell phone 505) accesses one of the provisioning entities, server 525 can store information regarding the user and/or cell phone accessing these provisioning entities. Each access by a user of a website can be stored as an interaction in a data structure in Server 525. Server 525 can store such information in a data structure (e.g., data structure 400) comprising several categories of information including, but not limited to, an interaction number; consuming entity identification; consuming entity location; provisioning entity identification; provisioning entity location; type of provisioning entity; duration of interaction; and time of interaction. The data structure can be analyzed by a data computation system (which can also be included in server 525 or similar devices) to analyze a performance of provisioning entities, for example, to estimate a number of unique consuming entities (e.g., users) per month, average amount of time a consuming entity spends on their website, time of the day where consuming entity traffic is highest or lowest, etc. It will be understood that any number of useful insights can be drawn by analyzing the data structure comprising interactions associated with consuming entities and provisioning entities. While FIG. 5, depicts a use case scenario of a cell phone user (exemplary consuming entity) accessing a website (exemplary provisioning entity), it will be understood that a process of analyzing interaction between a consuming entity and a provisioning entity can be extended to any number of scenarios, including, financial transactions between consumers and banks; credit card transactions between a consumer and a provisioning entity like a grocery store, movie theatre, gas station, mall, etc.

As described above, embodiments of the invention relate to analyzing entity performance in real-time based on interactions (e.g., anonymized credit card or debit card transaction data) and potentially other data (e.g., merchant data). In many ways, embodiments herein are related to U.S. patent application Ser. No. 14/306,138, entitled Methods and Systems for Analyzing Entity Performance, which is incorporated herein by reference.

Figure 6:
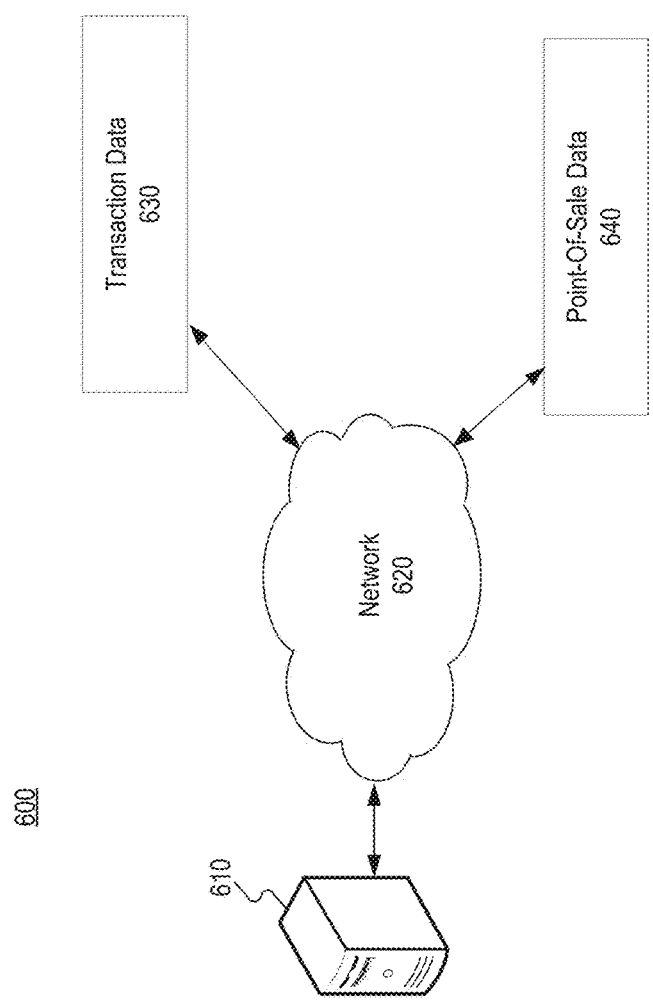
FIG. 6 is a block diagram of an exemplary system for analyzing entity performance, consistent with the embodiments of the present disclosure.

FIG. 6 is a block diagram of an exemplary system 600 for analyzing entity performance, consistent with the embodiments of the present disclosure. System 600 may include a server 610, a network 620, transaction data 630, and point-of-sale (PoS) data 640. In various embodiments, transaction data 630 can include, but is not limited to: card numbers, an issuing bank, a third party processor, a card association, a name, address, zip code, email address, or phone number associated with consuming entity, an address associated with a merchant, a type of provisioning entity (e.g., a pizza store), etc. Transaction data 630 and PoS data 640 can be sent over network 620 to server 610 for processing. Server 610, can act substantially similarly to server 525 of FIG. 5. For example, it can store a data structure and a data computation system, and/or server 610 can comprise multiple electronic devices, etc. As will be discussed below, transaction data 630 and PoS data can be included in a variety of storage devices, and transmitted to server 610 in real-time or near real-time.

Large sets of interaction data can be filtered in real-time or near real-time, according to criteria to provide information associated with the performance of a particular provisioning entity (e.g., a merchant, a retail provisioning entity, or the like) as described with reference to FIGS. 4, 5, and 6. As described above, consuming entities can include a purchaser of products or services. It should, however, be noted that in some embodiments an entity can be both a consuming entity and a provisioning entity.

In various embodiments, information associated with interactions (also referred to as transactions) are stored in one or more databases such as Vertica™ or Oracle™, which can be stored in server 610. Some databases—whether row based or column based—are not suited well for high user scale or pre-computing large amounts of information, such as aggregation of information associated with interactions (referred to herein as an aggregate, aggregation, or information associated with one entity or a cohort of entities). An aggregate can be used to render information, such as statistics, time, and money on the display of one or more electronic devices with a graphical user interface, for example, as shown in FIG. 4. In various embodiments, an aggregate can be computed once a week, once a day, less than every 15 minutes, less than every 5 minutes, or in real-time (or at least near real-time) by a data computation system, which can also be stored in server 610. Aggregates can be created by running queries (predefined or otherwise) on a data structure such as a data structure 400. Data computation systems used to create aggregates may use a variety of programming languages, such as Java, C, C++, etc., and store those aggregates in a data structure such as a distributed file system. Further, creating aggregates (e.g., processing queries) can be performed in parallel.

As described above, examples of an aggregate can include, but are not limited to: how much revenue a provisioning entity collected in a day; information representing market share of one or more provisioning entities in comparison to one or more other provisioning entities; location information; information representing wallet share associated with one or more provisioning entities and wallet share associated with one or more other provisioning entities (wherein wallet share includes a cost or time associated with an entity, such as how much money a consuming entity spent in a day at one or more provisioning entities and times associated therewith); etc. Other examples of data included in an aggregate (e.g., data used to create a cohort) can be found in U.S. patent application Ser. No. 14/306,138, as referenced above and incorporated in its entirety herein.

By using real-time data (also referred to as streaming data) or near real-time data to create an aggregate, a user can determine information associated with various aggregates each hour of the day, week, etc. This data can be acquired from transaction data 630, PoS data 640, or both. Further, aggregates can have varying degrees of granularity, such that a user may see the behavior of various consuming entities within the previous 15 minutes, for example. As another example, by using a data computation system that updates frequently, a user may be able to view a display on a mobile device (e.g., smartphone, wearable computer, etc.) to see how and where consuming entities are while the user is away from their office during a weekend. As yet another example, a user can view the last hundred transactions at a particular provisioning entity, or the last hundred transactions at a plurality of provisioning entities (including what products were purchased). In some embodiments, a user can view aggregates associated with a particular time. For instance, embodiments described herein can allow a user to view aggregates, such as revenue or types of products sold, during a particular time during the previous week. Various user interfaces described herein such as in FIG. 4 and in U.S. patent application Ser. No. 14/306,138 can display a plurality of aggregates, which can include various cohorts of consuming and/or provisioning entities and information associated therewith.

In some embodiments, the interactions are processed using a data computation system (which can be a part of a real-time distributed computation environment) that supports stream-oriented processing. In some embodiments, the data structure storing the interactions is incrementally updated at particular intervals, to provide a user with real-time information about the interactions. Example data computation systems include Apache's Spark™ or Storm™, which can operate in conjunction with the Hadoop Distributed File System and/or Amazon™ S3 which can store data structures that include transaction data, stream data, and other data discussed throughout this disclosure. Distributed file systems can store data which Apache's Spark™ uses to compute aggregates, cohorts, and the like. Example systems can be stored on hardware including one or more computers/ servers, and/or other multi-tenant environments comprising hardware (e.g., servers 525 or 610).

In various embodiments described herein, multiple streams of data can be acquired, stored, and used by a data computation system to produce aggregates. These streams can be acquired from transaction data 630, PoS data 640, or both. Further, in some embodiments streams of data can be used to create smaller streams of data (sub-streams). For instance, a stream can be segmented by information associated with one or more particular provisioning entities or consuming entities. In some embodiments, thousands, or hundreds of thousands of sub-streams can be processed using embodiments described herein.

In examples described below, a first stream that includes data associated with credit card and/or debit card transactions can be acquired (e.g., from transaction data 630) along with a second stream that includes data associated with a particular PoS system (e.g., from PoS data 640). Information from these streams can be compared, combined, and/or otherwise modified to produce data and statistics included in aggregates in real or near-real time, which can subsequently be displayed to a user.

A first stream of data including information associated with credit and debit card interactions can include over three-hundred million transactions per day, for example. This stream can include information associated with a location, a provisioning entity, a consuming entity, a Merchant Category Code (MCC), other information mentioned above with respect to FIG. 4, etc. Such a stream can also be divided into smaller streams, for instance, by provisioning entity (e.g., a merchant).

In addition, a second stream can be acquired that includes interaction information from a PoS system. Again, such a stream can be segmented into a variety of different streams, or additional streams can be acquired in various embodiments. Some PoS systems can acquire data such as goods or services purchased by a consuming entity. In various embodiments, PoS systems acquire less, the same, similar, or more data than a stream associated with credit card and/or debit cards. PoS systems can acquire (and subsequently transmit) information including, but not limited to: information indicative of products that are selling the most in the store (either by volume or revenue); information associated with the profits associated with various objects sold; information associated with a consuming entity (such as their identity, home location, billing address, etc.); information associated with the location of products in a store (e.g., their position in a physical location); information associated with cash (e.g., paper money) or other currency used at the PoS; information associated with bitcoin or other virtual currency used at the PoS; the number of consuming entities serviced by the PoS system; credit cards or debit cards used at the PoS; metadata associated with credit cards, debit cards, or virtual currency used at a PoS; information associated with purchases that involved more than one payment type (e.g., splitting a payment over two credit cards, or partially paying for a good or service with cash); an average amount of money that a plurality of consuming entities spend at a particular PoS system or provisioning entity; data indicating how frequently a consuming entity makes a transaction at a provisioning entity, and the frequency with which one or more consuming entities purchase one or more particular products; etc. PoS systems can also use various software and/or hardware systems to stream information to a data structure, as described above.

In some embodiments, data streams can be segmented to include information associated with new customers, returning customers (e.g., consuming entities that make a purchase at a provisioning entity at least twice within a particular amount of time), determining a home location associated with an individual based on transaction data (e.g., anonymized credit card transaction data), local customers, and non-local customers (e.g., a customer that lives at least a particular distance from the provisioning entity that the customer is making a purchase at). The aggregation of interaction information associated with these streams can be incrementally updated in a data structure (e.g., a distributed file system) in real-time, allowing a user to access a business portal and view a day-by-day, year-by-year, or even minute-by-minute break down of revenues generated, locations of interactions, etc. Of course, all of the above-mentioned functions can be performed by a data As noted above, in various embodiments one or more electronic devices can process the data included in the data streams. For example, one or more electronic devices hosting a data computation system (such as Apache's Spark™) can process the data. Various approaches can be implemented to process the data.

For example, all relevant acquired and/or stored data from a stream can be processed by one or more electronic devices to produce one or more aggregates (referred to herein as a batch process). In some cases, a portion of the acquired and/or stored data from a stream can be processed by one or more electronic devices. For instance, an electronic device can produce aggregates from data including previously produced aggregates. In such embodiments, it is possible for a device to incrementally update aggregates as additional information is acquired (e.g., from one or more streams of data).

Various approaches may be useful based on the type of task performed. For example, if previously collected data needs to be edited, if a new aggregate is created (e.g., a new query is added to create or modify aggregates), and/or another update/modification to the embodiments described herein is introduced, then a batch process may be performed (e.g., wherein queries are ran on all of the relevant data in the data structure).

Numerous queries can be run on a data structure using a data processing system. Example queries can include, but are not limited to: customer visits (e.g., a query that is used to compute a the number of new and returning customers that have visited a particular merchant over various time periods (last X days, last Y weeks, last Z months, last W years, etc.); travel distance (e.g., a query that is used to compute a histogram over the distances that customers have traveled to visit a merchant; visit frequency (e.g., a query that is used to compute a histogram over the number of times that a customer has visited a merchant); return statistics (e.g., a query that is used to compute a histogram over the number of days that it took a customer to return a merchant after his/her last visit; busiest days (e.g., a query that is used to compute a histogram showing revenue and transaction counts broken down by day of week such as Sunday through Saturday); busiest hours (e.g., a query that is used to compute a histogram showing revenue and transaction counts broken down by hour of day; daily transactions (e.g., a query that is used to compute a histogram showing revenue and transaction counts broken down by date); minutely transactions (e.g., a query that is used to compute a histogram showing revenue and transaction counts broken down by minute); customer home location map (e.g., a query that is used to compute a heatmap/choropleth showing inferred customer home locations for a merchant); customer spend map (e.g., a query that is used to compute a heatmap/choropleth showing inferred customer spend locations for a merchant); revenue by payment type (e.g., a query that is used to compute a histogram showing revenue and transaction counts broken down by payment type (e.g., credit vs. cash)); sales numbers (e.g., a query that is used to compute total revenue, number of distinct orders, number of distinct customers, and number of sold units over a given time period); item numbers (e.g., a query that is used to compute histogram of revenue, order count, customer count, and unit count broken down by item SKU); accompanying items (e.g., a query that is used to compute histogram of revenue, order count, customer count, and unit count broken down by pairs of item SKUs that have been bought together); recent transactions (e.g., a query that is used to compute a rolling history of the K most recent transactions in a given time period), etc.

In some embodiments, where the aggregates are incrementally updated, a batch process may not be necessary. For instance, data acquired from a stream can be processed along with previously acquired data (e.g., data that has already been used to produce an aggregate) to provide a user with information faster than if the aggregates were to be created using all of the data, as with a batch process. In various embodiments, predetermined queries can be run on data that has not been used to create an aggregate along with previously created aggregates. It should be appreciated that the previously aggregated data can include hundreds of millions of transactions and data associated therewith. Thus, incrementally modifying aggregates can reduce processing time and the amount of resources required (e.g., memory, processing power, etc.), resulting in improvements to traditional computers. Further, incrementally modifying aggregates allows users to view the updated aggregates in real or near-real time.

In some embodiments, a PoS system may be installed, replaced, changed, or otherwise modified. In such a case, a typical user does not want to only be able to see aggregates (e.g., sales, revenue, etc.) beginning at the point in time that the PoS system was installed (or when the PoS system started being used). Users typically want to see historical data predating the PoS system. In such a case, a stream can be acquired that contains additional information, such as information from before a new PoS system is installed.

In some embodiments, a covert stream can be processed. A covert stream can include two or more streams (e.g., it can include a blended stream). For instance, when a new PoS system is installed or otherwise reset such that it does not have access to historical data, in addition to the stream of data acquired from the PoS system, another stream of data can be acquired. In such a case, the data from a first stream that includes information associated with credit cards and/or debit cards can be blended with the data generated by the PoS system. In some embodiments, information associated with a cohort (e.g., a group of entities), can be provided to a user based on data associated with an entity. In some cases, data associated with an entity such as an MCC, a location, the size of the entity or other criteria can be used to determine a cohort, and information associated with that cohort can be provided to a user. For instance, this information can be used to compare sales with a similar entity.

Information can be provided in a variety of methods. For instance, aggregates or other data can be provided via email, or when a user logs on to a web portal. Emails or information provided via a website can include summaries of data, such as interesting information associated with transactions that occurred during a previous week, month, or year. These summaries can be preformatted (e.g., to include information about a previous week's revenue). In some cases, one or more different aggregates can be selected and viewed by a user.

Figure 7:
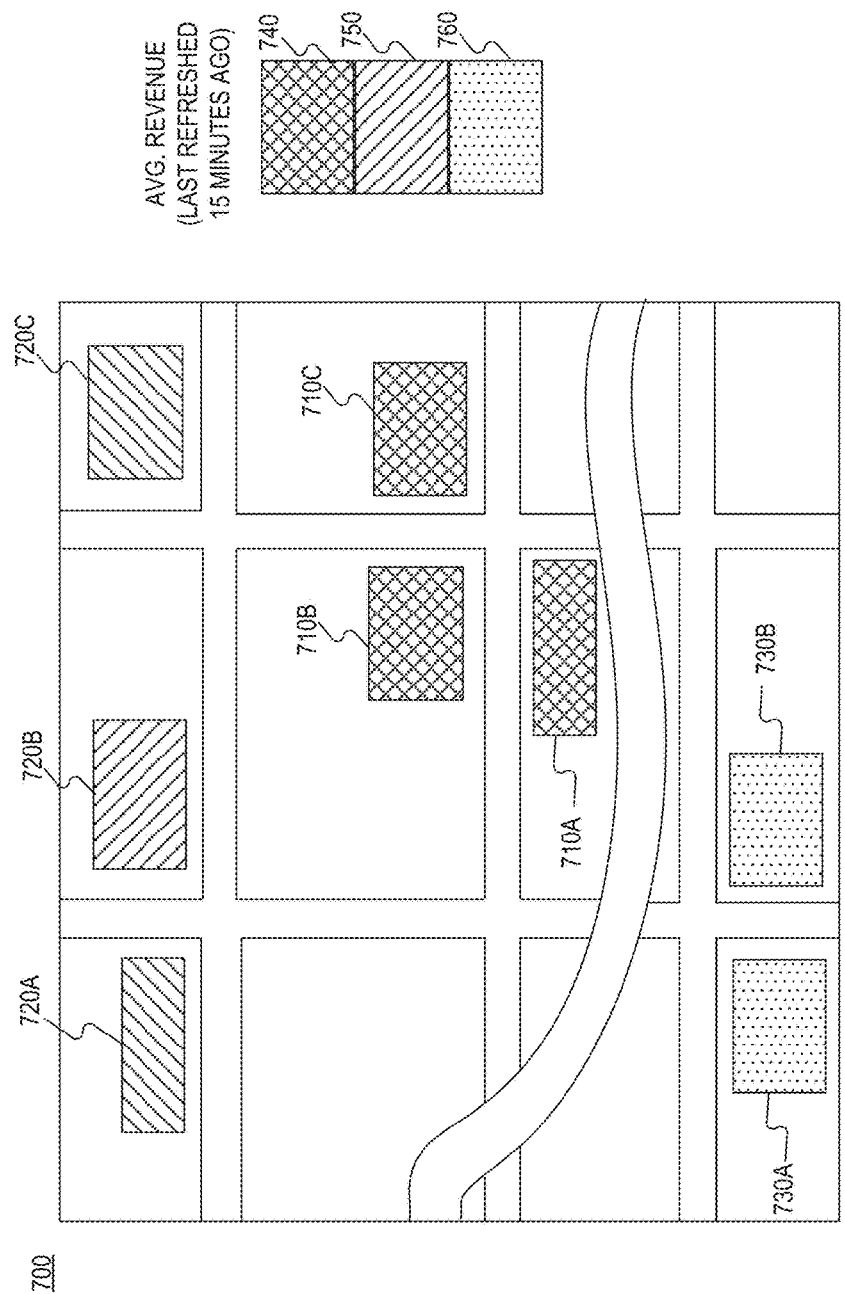
FIG. 7 is an illustration of an example display, consistent with the embodiments of the present disclosure.

FIG. 7 is an illustration of an example display 700, consistent with the embodiments of the present disclosure. In various embodiments, data generated by a data processing system can be used to create various illustrations. For example, display 700 illustrates a display 700 that discloses an average amount of money spent at various entities up to 15 minutes ago. Of course, in various embodiments, such illustrations, graphs or other types of displays based on data processed by the data processing system can be updated in real- or near-real-time, as discussed above. As the example in display 700 illustrates, entities 710A, 710B, and 710C had a greater average revenue up to 15 minutes ago than entities 720A, 720B, or 720C, which in turn had a greater average revenue than entities 730A or 730B. This is shown by the indicator bar on the right that shows the relative revenues of entities with the shading of boxes 740, 750, and 760. Of course, a number of different queries can be run on a data processing system to determine other attributes of entities, such as an average revenue in the last week, day, hour, etc. Further, as mentioned above, various graphs, maps, pie charts, textual displays, types of stores, etc. can be displayed in a display such as 700 based at least in part on the data processed by a data processing system such as Apache's Spark™.

Figure 8:
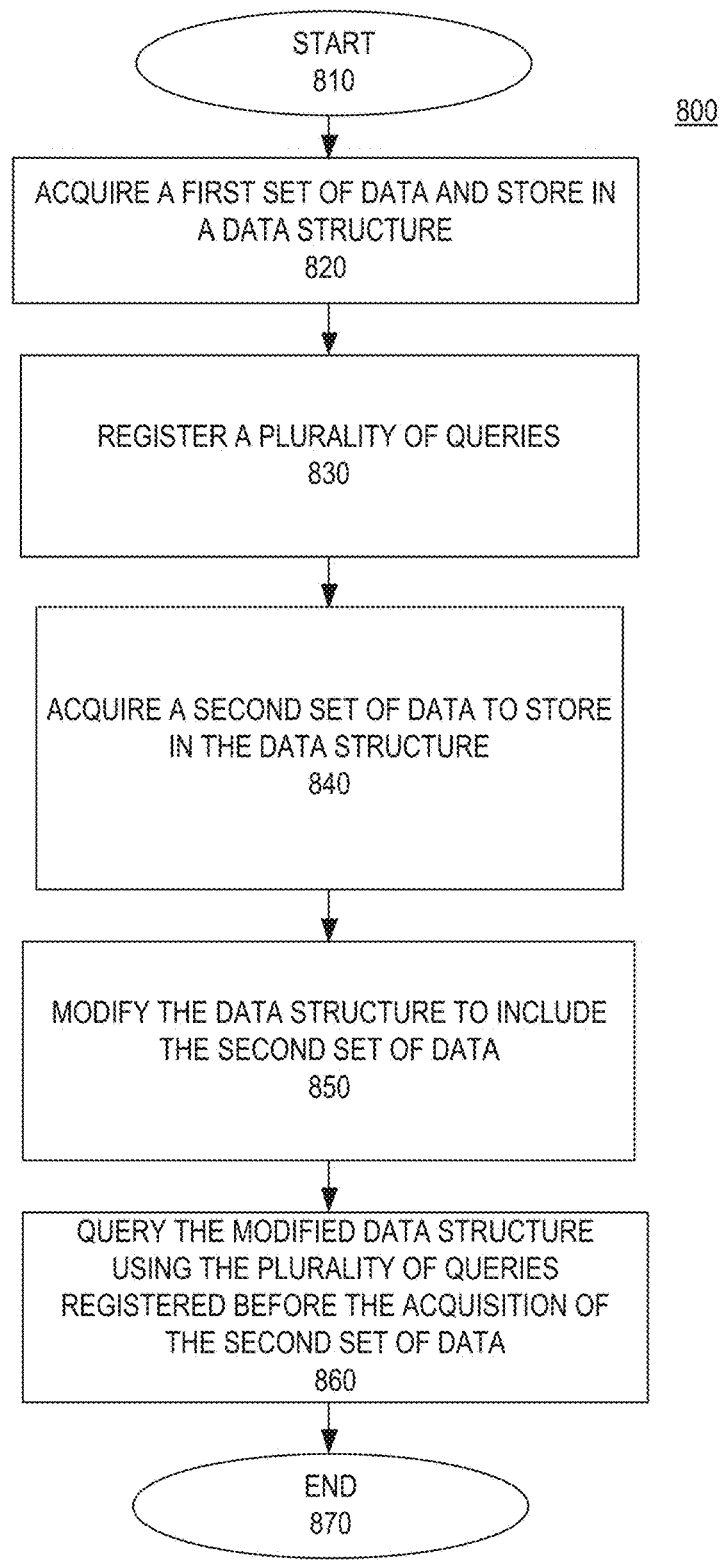
FIG. 8 is a flowchart representing an exemplary process for querying a data structure, consistent with embodiments of the present disclosure.

FIG. 8 is a flowchart 800 representing an exemplary process for querying a data structure, consistent with embodiments of the present disclosure. Flowchart 800 starts at step 810 and at step 820 acquires a first set of data and stores it in a data structure. For example, the first set of data can be transaction data (e.g., data associated with a card transaction such as a card number), and be inserted into a data store (distributed or otherwise) such as Hadoop's Distributed File System, Vertica™, or Amazon™ S3. This data can be acquired from transaction data 630, PoS data 640, or both. As described above and in the patent associated by reference herein, the data in the data structure can include interactions between entities. For example, it may include an interaction between a consuming entity and a provisioning entity. In various embodiments, transaction data can be pulled from the data store into a computation system (distributed or otherwise), such as Apache's Spark™.

As discussed above, in various embodiments a data computation system can process data and produce or update a plurality of aggregates, which after being computed are stored in a data store, which may include the data store that the transaction data was stored in. For example, at step 830, a plurality of queries can be created and/or registered, and can be used to process data and produce or update aggregates. Queries may be used to extract particular data out of the data structure based on various attributes associated with the data in the data structure. These attributes can include the location of an entity, the estimated location of an entity, an amount of revenue associated with an entity, an amount of money in an entity's bank account, the name of an entity's bank, the age of an entity, people associated with an entity, etc.

At step 840, a second set of data is acquired. Similarly, this data can be pulled from a data store, which may be a different data store or the same data store that the first set of data was pulled from. The second set of data may be collected and/or added to the data structure before or after a set of queries are created and/or registered. This second set of data can include interactions, or attributes associated with interactions.

At step 850, the data structure is modified to include the second set of data. As such, the data structure can include both the first set of data and the second set of data. Of course, additional sets of data can be collected and stored in addition to the second set of data. Also, additional data can be tagged. For instance, a set of data added on a particular date can be tagged with a unique identifier (e.g., the date).

At step 860, the modified data structure is queried using the plurality of queries created and/or registered. As mentioned above, these queries may be registered before the second set of data is acquired or added to the data structure. In any event, the data derived from the query can be provided to an electronic device (e.g., via a network), or otherwise displayed to a user. In some embodiments, an electronic device can create a web-consumable version of the aggregates. Aggregates can be used to generate and/or modify a key-value store (e.g., Apache's Cassandra™ and/or Elasticsearch), where they can be accessed by the various front-end pieces of code. After being accessed, aggregates (or portions thereof) can be displayed to a user.

At step 870 flowchart 800 ends.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system comprising:
a memory device configured to store a set of instructions for facilitating a displaying of an aggregate in at least near-real-time in a user interface, the facilitating including reducing an amount of processing time and an amount of resources required to perform the displaying of the aggregate by incrementally updating the aggregate instead of using a batch process to create an additional aggregate; and
one or more processors configured to execute the set of instructions, the executing of the set of instructions causing the system to, at least:
acquire a data stream of payment card and transaction data from a first source, the data stream of the payment card and transaction data comprising a first-data stream;
store a first set of data in a data structure, the first set of data taken from the first data stream, the first set of data including at least a portion of the payment card and transaction data;
produce the aggregate from the first set of data by running a query on the data structure;
acquire a data stream of interaction data from a second source, the data stream of the interaction data comprising a second data stream;
perform the incremental updating of the aggregate, the incremental updating including creating a modified data structure based on the data structure, the modified data structure including a second set of data into the aggregate, the second set of data taken from the second data stream and including at least a subset of the interaction data; and based on the incremental updating of the aggregate, run the query on the modified data structure and modify the user interface in at least near-real time to include at least some of the second set of data as it is acquired from the second data stream.

2. The system of claim 1, wherein the data structure is stored in random access memory of a cluster computing framework configured to process data within the data structure in at least near real-time.

3. The system of claim 2, wherein the first data stream and the second data stream are segmented by new customers and returning customers by determining whether a consuming entity identified in the first set of data or the second set of data has made multiple purchases within a predetermined amount of time.

4. The system of claim 2, wherein the first data stream and the second data stream are segmented by local customers and non-local customers by comparing a home address of a consuming entity with the first set of data or the second set of data.

5. The system of claim 1, wherein the interaction data corresponds to a consuming entity and at least one of a set of consuming entity categories, the consuming entity categories including at least one of identification, location, loyalty, credit card type, age, gender, income, children, product information, and service information.

6. A method comprising:
performing operations to facilitate a displaying of an aggregate in at least near-real-time in a user interface, the facilitating including reducing an amount of processing time and an amount of resources required to perform the displaying of the aggregate by incrementally updating the aggregate instead of using a batch process to create an additional aggregate, the operations including:
acquiring a data stream of payment card and transaction data from a first source, the data stream of the payment card and transaction data comprising a first data stream;
storing a first set of data in a data structure, the first set of data taken from the first data stream, the first set of data including at least a portion of the payment card and transaction data;
producing the aggregate from the first set of data by running a query on the data structure;
acquiring a data stream of interaction data from a second source, the data stream of the interaction data comprising a second data stream;
performing the incremental updating the aggregate, the incremental updating including creating a modified data structure based on the first data structure, the modified data structure including a second set of data into the aggregate and including at least a subset of the interaction data; and
based on the incremental updating of the aggregate, running the query on the modified data structure and modifying the user interface in at least near-real time to include at least some of the second set of data as it is acquired from the second data stream, one or more modules incorporated into one or more memories of a computer system to configure one or more processors of the computer system to implement the performing of the incremental updating and modifying of the user interface.

7. The method of claim 6, wherein the data structure is stored in random access memory of a cluster computing framework configured to process data within the data structure in at least near real-time.

8. The method of claim 7, wherein the first data stream and the second data stream are segmented by new customers and returning customers by determining whether a consuming entity identified in the first set of data or the second set of data has made multiple purchases within a predetermined amount of time.

9. The method of claim 7, wherein the first data stream and the second data stream are segmented by local customers and non-local customers by comparing a home address of a consuming entity with the first set of data or the second set of data.

10. The method of claim 6, wherein the interaction data corresponds to a consuming entity and at least one of a set of consuming entity categories, the consuming entity categories including at least one of identification, location, loyalty, credit card type, age, gender, income, children, product information, and service information.

11. A non-transitory computer-readable medium storing a set of instructions that are executable by one or more processors of an apparatus to cause the apparatus to perform operations to facilitate a displaying of an aggregate in at least near-real-time in a user interface, the facilitating including reducing an amount of processing time and an amount of resources required to perform the displaying of the aggregate by incrementally updating the aggregate instead of using a batch process to create an additional aggregate, the operations comprising:
acquiring a data stream of payment card and transaction data from a first source, the data stream of the payment card and transaction data comprising a first data stream;
storing a first set of data in a data structure, the first set of data taken from the first data stream, the first set of data including at least a portion of the payment card and transaction data;
producing the aggregate from the first set of data by running a query on the data structure;
acquiring a data stream of interaction data from a second source, the data stream of
the interaction data comprising a second data stream;
performing the incremental updating the aggregate, the incremental updating including creating a modified data structure based on the first data structure, the modified data structure including a second set of data into the aggregate, the second set of data taken from the second data stream and including at least a subset of the interaction data; and
based on the incremental updating of the aggregate, running the query on the modified data structure and modifying the user interface in at least near-real time to include at least some of the second set of data as it is acquired from the second data stream.

12. The non-transitory computer readable storage medium of claim 11, wherein the data structure is stored in random access memory of a cluster computing framework configured to process data within the data structure in at least near real-time.

13. The non-transitory computer readable storage medium of claim 12, wherein the first data stream and the second data stream are segmented by new customers and returning customers by determining whether a consuming entity identified in the first set of data or the second set of data has made multiple purchases within a predetermined amount of time.

14. The non-transitory computer readable storage medium of claim 12, wherein the first data stream and the second data stream are segmented by local customers and non-local customers by comparing a home address of a consuming entity with the first set of data or the second set of data.

15. The non-transitory computer readable storage medium of claim 11, wherein the interaction data corresponds to a consuming entity and at least one of a set of consuming entity categories, the consuming entity categories including at least one of identification, location, loyalty, credit card type, age, gender, income, children, product information, and service information.

16. The system of claim 1, wherein the amount of the interaction data is so large that the incremental updating of the aggregate enables the facilitating of the displaying of the updated aggregated in at least near-real-time in the user interface.

17. The system of claim 1, wherein the resource requirements include at least one of memory of the system and processing power of the system.

18. The system of claim 1, wherein the including of the second set of data into the aggregate is performed incrementally at pre-determined time intervals.

19. The system of claim 18, wherein the predetermined time interval is configurable by a user who is viewing the user interface.

* * * * *

UNITED STATES PATENT AND TRADEMARK OFFICE
CERTIFICATE OF CORRECTION

PATENT NO. : 10,103,953 B1
APPLICATION NO. : 14/800447
DATED : October 16, 2018
INVENTOR(S) : Chang et al.

It is certified that error appears in the above-identified patent and that said Letters Patent is hereby corrected as shown below:

On the Title Page

On page 10, in Column 2, item (56) under "Other Publications", Line 1, delete "1 "Great" and insert --"Great-- therefor In the Claims In Column 24, Line 54, in Claim 1, delete "first-data" and insert --first data-- therefor In Column 26, Line 43, in Claim 11, after "of", delete "¶"

In Column 27, Line 24, in Claim 19, delete "predetermined" and insert --pre-determined-- therefor Signed and Sealed this
Eleventh Day of June, 2019

Andrei Iancu
*Director of the United States Patent and Trademark Office*